United States Patent [19]

Muramatsu et al.

[11] Patent Number: 5,548,364

[45] Date of Patent: Aug. 20, 1996

[54] LENS-FITTED PHOTOGRAPHIC FILM UNIT AND METHOD OF MANUFACTURING THE SAME

[75] Inventors: Katsuji Muramatsu, Tokyo; Shoji Iwamoto, Kanagawa, both of Japan

[73] Assignee: Fuji Photo Film Co., Ltd., Kanagawa, Japan

[21] Appl. No.: 340,370

[22] Filed: Nov. 14, 1994

Related U.S. Application Data

[63] Continuation of Ser. No. 62,983, May 18, 1993, abandoned.

[30] Foreign Application Priority Data

| May 25, 1992 | [JP] | Japan | 4-132842 |
| May 25, 1992 | [JP] | Japan | 4-132843 |
| May 27, 1992 | [JP] | Japan | 4-135375 |
| May 18, 1992 | [JP] | Japan | 4-124518 |

[51] Int. Cl.$^6$ ................................................ G03B 17/42
[52] U.S. Cl. ............................................. 354/204; 354/212
[58] Field of Search .................................... 354/204, 205, 354/206, 212, 213, 214, 215, 217, 218, 288, 275

[56] References Cited

U.S. PATENT DOCUMENTS

| Re. 34,168 | 1/1993 | Ohmura et al. | 354/288 X |
| 4,884,087 | 11/1989 | Mochida et al. | 354/288 |
| 4,954,857 | 9/1990 | Mochida et al. | 354/288 X |
| 4,972,649 | 11/1990 | Mochida et al. | 354/288 |
| 5,136,313 | 8/1992 | Muramatsu et al. | 354/212 X |
| 5,210,561 | 5/1993 | Nakai et al. | 354/288 |
| 5,235,366 | 8/1993 | Kucmerowski | 354/212 |

*Primary Examiner*—Howard B. Blankenship
*Attorney, Agent, or Firm*—Young & Thompson

[57] ABSTRACT

A lens-fitted film unit is preloaded with photographic film, and has an eight-toothed driven sprocket wheel in mesh with perforations on the film. When the photographic film is fed by one frame, the sprocket is caused to make one rotation. A shutter mechanism is cocked responsive to rotation of the sprocket. During assembly of the film unit, the shutter mechanism is cocked. The photographic film is loaded while the shutter mechanism remains cocked. In a preferred embodiment, the sprocket is set in a predetermined rotated position which is two teeth short of the position at the end of one winding up of the film. This brings the shutter mechanism into an incompletely cocked state. The photographic film is loaded while the shutter mechanism remains in the incompletely cocked state. In the film unit, a film passageway is provided behind the main body, for passage of the film. A shiftable engaging portion projects into the film passageway in retractable fashion. A notch is formed in an edge of the film, is engaged with the shiftable portion, and during assembly properly positions the film within the film passageway relative to the lengthwise direction of the film.

20 Claims, 23 Drawing Sheets

LENS-FITTED PHOTOGRAPHIC FILM UNIT AND METHOD OF MANUFACTURING THE SAME

This application is a continuation of application Ser. No. 08/062,983, filed May 18, 1993, now abandoned.

BACKGROUND OF THE INVENTION

1. Field of the Invention

The present invention relates to a lens-fitted photographic film unit and a method of manufacturing the same. More particularly, the present invention relates to a lens-fitted film unit with which a user can take more photographs than a standard number of the photographable frames of the strip of photographic film contained therein, and a method of manufacturing such a film unit.

2. Description Related to the Prior Art

A 135-type photographic filmstrip (hereinafter referred to as film) in a cassette as defined by ISO code 1007, 1979 version, is given a standard number of photographable frames and a length sufficient for such frames (ISO signifies International Organization for Standardization). A user takes photographs to expose a series of the standard number of frames on the film. There are, however, occasions on which a conventional camera happens to take on standard film one or two exposures in addition to the standard number of exposures. Because such a conventional camera is manually loaded with film by a user, it is impossible, after completing exposure of the film, to estimate with precision the position of the picture frame nearest to the film leader. Thus it cannot be known how much leader can be pulled out of a cassette for development without accidental exposure of a picture to ambient light. In consideration of this, tile prevailing standard provides an allowance of film beyond the length sufficient for the nominal number of exposures.

The available length of the film is defined as the distance between the mouth of the cassette and the film leader when the film is fully drawn out of the cassette. As pointed out above, this available length is set to be longer than the series of the stated number of frames, and includes a lengthwise allowance to be left unexposed, which is approximately four times as long as a single frame. It is therefore possible in a camera to make on a film one to three exposures in addition to the stated number of exposures, which is dependent upon a manner of loading tile camera with the film.

Lens-fitted photographic film units (hereinafter referred to simply as film units) are now on the market, e.g. under the trademark "Quick Snap" (manufactured by Fuji Photo Film Co., Ltd.). Such known film units are disclosed in e.g. U.S. Pat. Nos. 4,884,087 and 4,972,649, and are a single-use camera preloaded with photographic film. Such a film unit has a film housing of which a front cover and a rear cover are secured to a main body, in which body a taking lens, a film wind-up wheel and a shutter mechanism are incorporated. The main body is provided with a film supply chamber and a cassette-containing chamber formed on opposite horizontal sides of the taking lens. The unexposed film is wound in a roll in the film supply chamber. The externally rotatable wind-up wheel is engaged with a spool in the cassette contained in the film take-up chamber. A user who has purchased the film unit winds the film frame by frame back into the cassette after each exposure.

A driven sprocket wheel engages perforations in the film, and, when the film is wound up, is rotated by the moving film. When the film is wound up by one frame, namely eight perforations, responsive rotation of the sprocket causes a wind-up stopping mechanism to prevent the wind-up wheel from rotating further, cocks the shutter mechanism, and steps the count of a count-indicating wheel.

The film unit as manufactured must be inspected before it can be shipped, because the film unit should be usable with high reliability, without difficulties caused by manufacture of the film unit. It is usual to inspect the operation of the shutter mechanism. After the main body is loaded with the drawn-out film and its cassette, the shutter mechanism is cocked and then released, so as to check the operation.

There is a problem in this inspection of the film unit to be shipped. Cocking and releasing of the shutter mechanism for checking the operation must spend one frame of the film, with a length of eight perforations, and thus reduces the lengthwise allowance of the film available for possible exposures in addition to the stated number of photographable frames. If inspection other than the operation of the shutter of the film unit is performed, more than one frame will be spent.

OBJECT OF THE INVENTION

In view of the foregoing problems, an object of the present invention is to provide a method of manufacturing a lens-fitted photographic film unit, which method is suitable for enabling a user to take more photographs than the stated number of photographable frames for the strip of photographic film contained therein.

SUMMARY OF THE INVENTION

The present invention permits utilizing nearly the full length of the film in a lens-fitted photographic film unit, which has been loaded with the film by the manufacturer in a darkroom by a process in accordance with the present invention. Heretofore, no film unit has been known which is capable of making on a photographic film one or several more exposures than the stated number of exposures of the film, although about six years have passed since the beginning of marketing of lens-fitted photographic film units.

The lens-fitted film unit of the present invention includes a sprocket in mesh with perforations in the photographic film and rotated through a predetermined angle when the photographic film is advanced one frame, and includes a shutter mechanism that is cocked responsive to rotation of the sprocket. The manufacturing method includes first and second steps. The first step consists in setting the sprocket in a first rotated position in order to bring the shutter mechanism into a first cocking state. The second step consists in, after the first step, loading the photographic film.

In a preferred embodiment, the shutter mechanism is cocked in that first cocking state. Subsequently, the photographic film is loaded while the shutter mechanism remains cocked.

In another preferred embodiment, the first rotated position of the sprocket is N teeth before the position of the sprocket at the end of one winding up of the film, wherein the sprocket has eight teeth, and $1 \leq N \leq 7$. The shutter mechanism in the first rotated position of the sprocket is in this instance incompletely cocked.

This construction is favorable for manufacturing the film unit, because only a small portion of the film is spent for inspection of the shutter mechanism. There is no reduction in lengthwise allowance of the film available for exposures in addition to the stated number of photographable frames.

A user can take more photographs than the stated number of photographable frames of the strip of photographic film.

Inspection other than that of the shutter operation of the film unit may confirm and evaluate the torque for rotation of the wind-up wheel after loading of the film. Because the wind-up wheel would be rotated for such inspection in a conventional manufacture, almost two frames might be spent for inspection of both the wind-up wheel and the shutter mechanism. In the present invention, however, there is still no reduction in lengthwise allowance of the film available for exposures in addition to the stated number of photographable frames.

Furthermore, a film passageway is formed between the main body and the rear cover for passage of the film. An engaging member is arranged to project into the film passageway in retractable fashion. A notch is formed in an edge of the film, for engagement with the projected engaging member, in order to retain the film in the film passageway, and is adapted, upon the loading of the main body with the film, to position the unexposed film in a lengthwise direction within the film passageway.

In a film cassette in which film is to be used for additional exposures, drawing out the film leader during development by the usual length might subject to ambient light the frame nearest to the film leader in a conventional construction. But in the present invention, the film is positioned relative to the driven sprocket associated with cocking of the shutter, so that the interval between the frame nearest to the film leader and the end of the film leader can be kept unchanged among a plurality of strips of film. Therefore, the present invention is effective to determine the amount of drawing out of the film leader during development. The film leader can thus be drawn out without subjecting the leading first frame to ambient light.

In another preferred embodiment, a counter is driven by the sprocket, which counter is provided with numerical indications of photographable frames, the numerical indications including an indication of a maximum predetermined number in excess of P, wherein P is the standard or stated number of picture frames. Then the film is drawn, in a darkroom, fully out of the cassette, while winding the drawn-out film to be the roll. The main body of the film unit is loaded with the cassette and this roll.

Conventionally, a user using a camera would load it with the film while drawing out the film leader manually. The user could take 26 or 27 photographs on the film stated to provide 24 exposures, but would fog, namely, subject to ambient light, one or two frames next to the film leader. Thus it has been difficult to take photographs of greater number than the stated number of exposures on the film. In the novel lens-fitted photographic film unit of the present invention, however, it is possible and easy to take good photographs greater in number than the stated number of exposures on the film, without fear of fogging. With the counter in the novel film unit adapted to display the increased number of picture frames, the counter can correctly indicate information as to the available number of picture frames.

Furthermore, the sprocket is click-stopped in the condition of release of the shutter mechanism. The film is loaded while the sprocket remains thus click-stopped.

The driven sprocket can remain set in one position while the main body is being loaded with the photographic film. Areas remaining unused on the film are reduced by providing additional picture frames. The film can be used efficiently and economically, so that photographs can be obtained efficiently and economically with conventional developing systems. Thus for a given cost of the film unit, performance of the film unit is improved because more pictures can be taken for the same cost. As to the raw material for photographic film, it is possible to enjoy the benefits of economy and the saving of limited natural resources.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
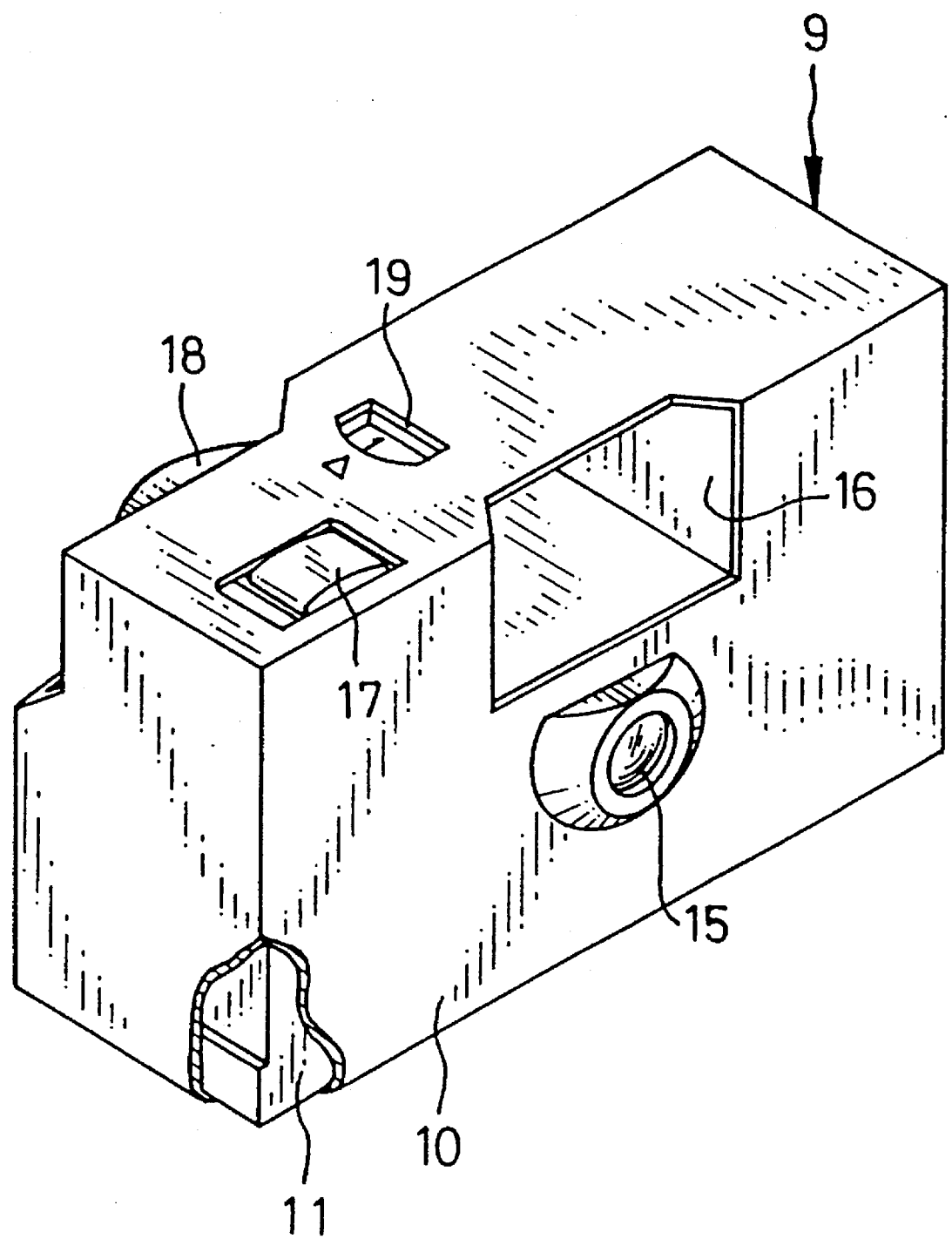
FIG. 1 is a perspective view illustrating a lens-fitted photographic film unit in accordance with the present invention.
Figure 2:
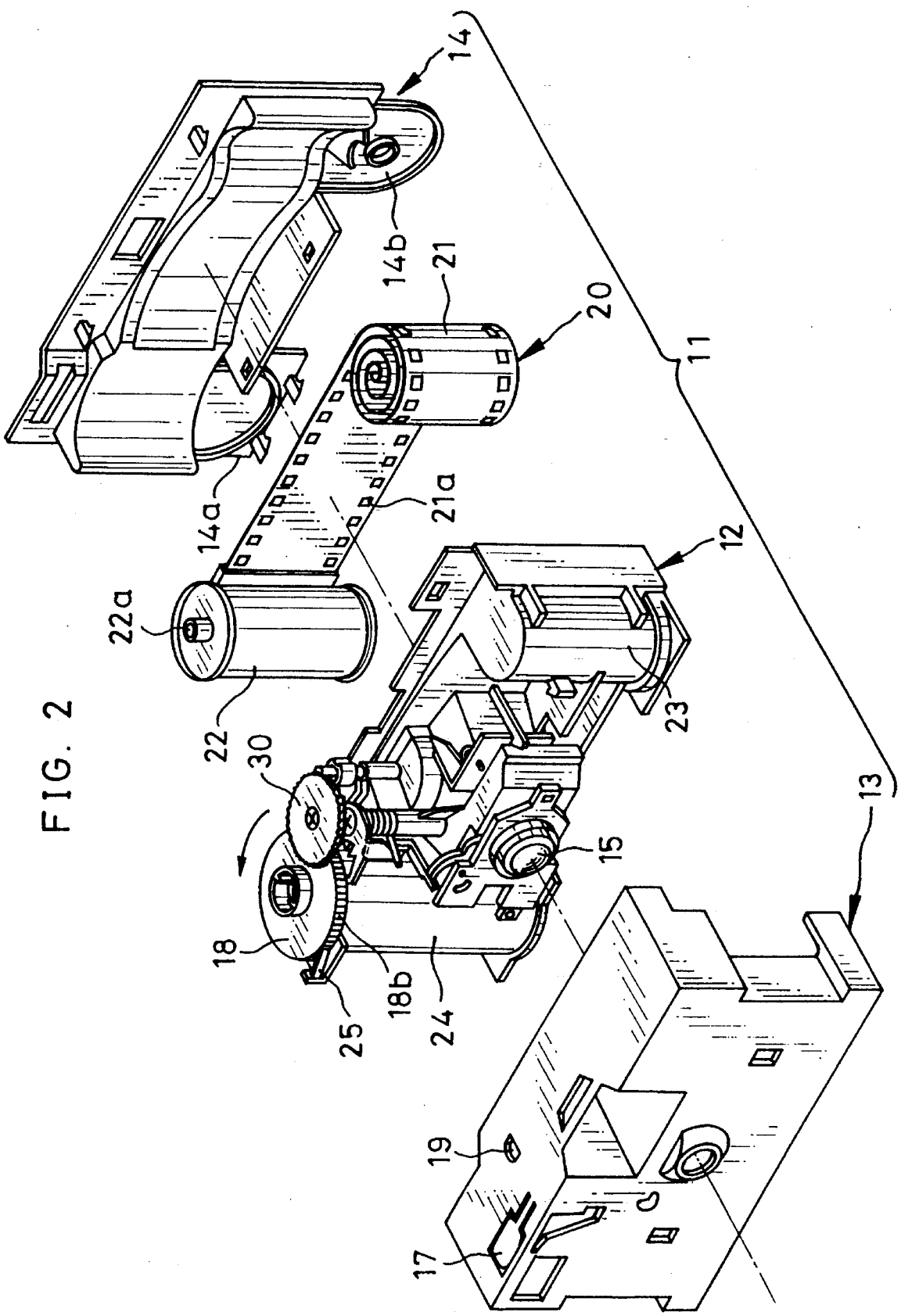
FIG. 2 is an exploded perspective view illustrating the film unit.
Figure 3:
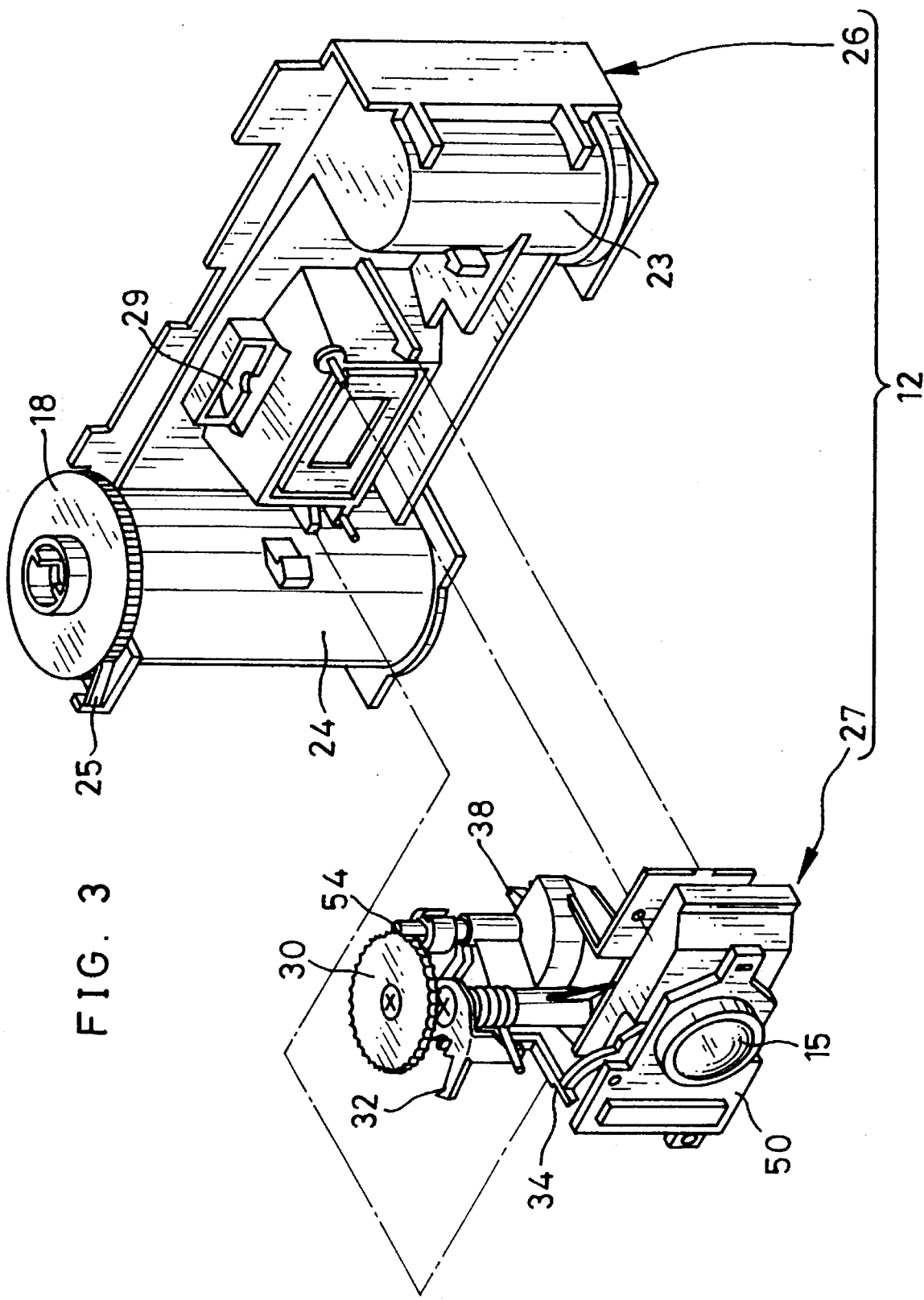
FIG. 3 is an exploded perspective view illustrating a main body of the film unit.

FIGS. 1 to 3 generally illustrate a lens-fitted photographic film unit 9 according to the present invention. An outer casing 10 of cardboard contains a film housing 11, which is constituted by a main body 12, front cover 13, and a rear cover 14. The main body 12 consists of a film-containing section 26 and a photo-taking mechanical section 27. The film housing 11 is provided with a taking lens 15, a finder window 16, a release button 17, a film wind-up wheel 18, and an indicator window 19, which are, when desired, operable through openings formed in the outer casing 10.

There is formed an exposure chamber 28 in the rear of the film-containing section 26. Beside the exposure chamber 28 are arranged a film supply chamber 23 and a cassette-containing chamber 24. The exposure chamber 28 is nearer to the cassette-containing chamber 24 than the film supply chamber 23. Arrangement of the exposure chamber 28 relative to the cassette-containing chamber 24 is so defined that approximately three to five successive perforations 21a in photographic film 21, preferably four perforations, are located between an exposure aperture 28a of the exposure chamber 28 and a passage mouth 22b in a cassette shell 22 contained in the cassette-containing chamber 24. A driven sprocket wheel 38, to be described later in detail, partly emerges from a slot 29 formed near the exposure chamber 28, and is engaged with the perforations 22a of the photographic film 21 in a film passageway.

Figure 4:
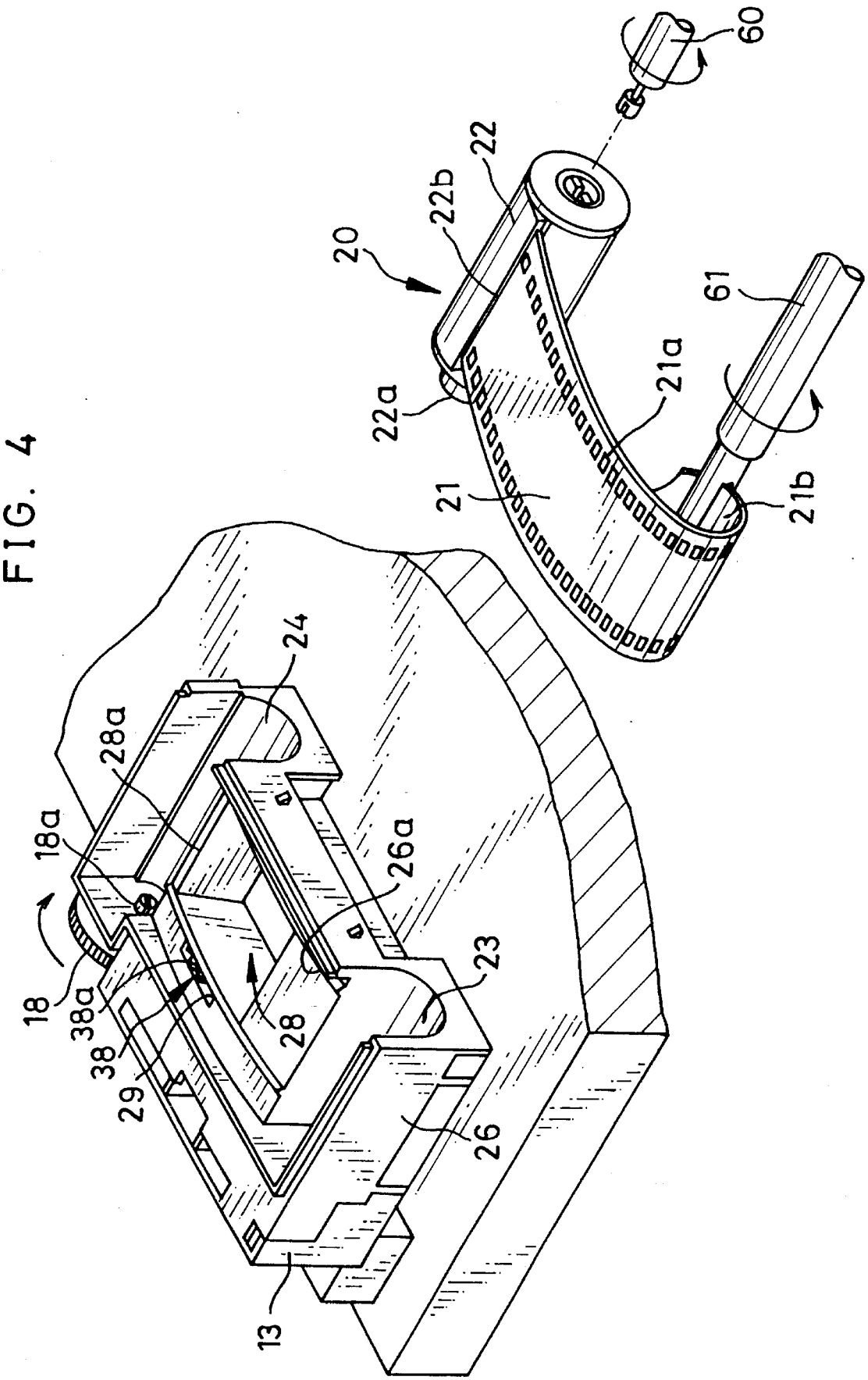
FIG. 4 is a perspective view illustrating a step wherein the main body is loaded with photographic film.

The photographic film cassette 20 is constituted by the cassette shell 22 and the photographic film 21 which is 35 mm wide, initially contained in the cassette shell 22 in light-tight fashion, and drawn out of the cassette shell 22 to form the film roll. The roll of photographic film 21 is contained in the film supply chamber 23, whilst the cassette shell 22 is contained in the cassette-containing chamber 24. To load the film-containing section 26 with the film, the photographic film cassette 20 is subjected to a pre-winding operation in which the film 21 is drawn out of the cassette shell 22. To do this, a loading jig including a drive shaft 61 and a driven shaft 60 is used, as illustrated in FIG. 4. With the drive shaft 61 is engaged a leader 21b of the film 21. In the spool 22a is inserted the driven shaft 60. The drive shaft 61 drives the film 21 and winds it in a roll, while pulling it out of the cassette shell 22.

The rear cover 14 is provided with bottom lids 14a and 14b having a flip-top structure and covering the bottoms of the chambers 23 and 24. When the rear cover 14 is attached to the main body 12, the lids 14a and 14b are left open, so as to make it easy to withdraw the shafts 60 and 61 from the cassette 20 and the film roll after setting the film 21 in the film-containing section 26.

On the top of main body 12, a wind-up wheel 18 is arranged over the cassette-containing chamber 24 and has a fork 18a which projects into the cassette-containing chamber 24 to engage with the spool 22a of the cassette 20. When the wind-up wheel 18 is rotated to the right as viewed from the rear, or in the arrow-indicated direction as shown, then the spool 22a is so rotated as to wind up the film 21 after each exposure back into the cassette shell 22. Around the wheel 18 are formed teeth 18b, which are engaged with a plate-shaped reversion-preventing claw 25 having a spring characteristic. The reversion-preventing claw 25 prevents reverse rotation of the wind-up wheel 18, and allows it only one direction of rotation.

Figure 5:
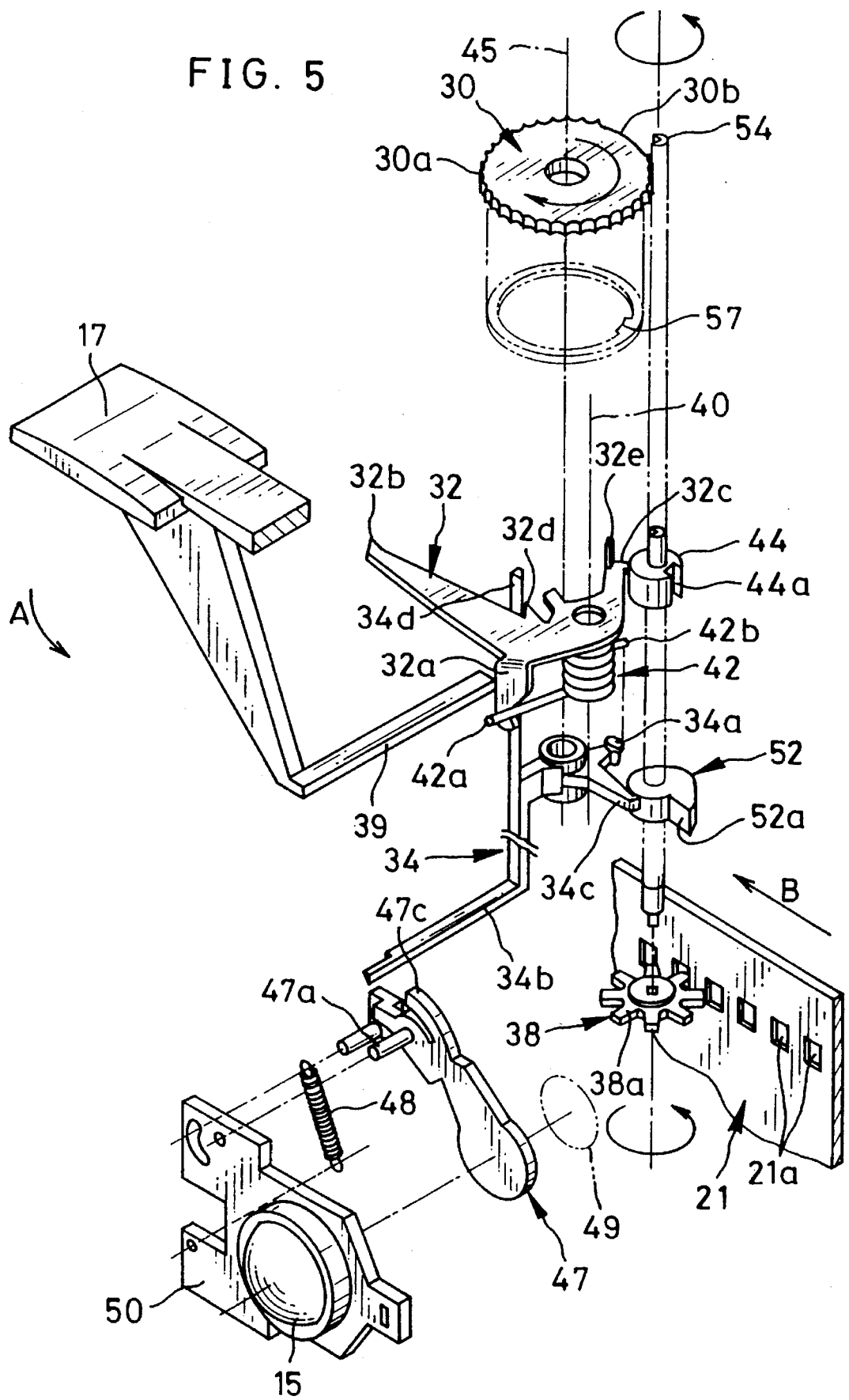
FIG. 5 is an exploded perspective view illustrating the shutter mechanism and related mechanisms.

In the mechanical section 27, there are arranged inter alia a count-indicating wheel 30, a retaining lever 32, an actuating lever 34, a shutter blade 47, and a driven sprocket 38. In FIG. 5 illustrating these in detail, the shutter button 17 is formed as a portion surrounded by a channel-shaped through slot in the front cover 13. When depressed, the button 17 is shifted in the arrow-indicated direction A as shown. Under the button 17, an arm 39 extends down and to the rear. Note that the resilience of the button 17 causes it to recover its initial position, immediately upon the release of the shutter mechanism.

The retaining lever 32 is swingable around a shaft 40, and has a crooked end 32a biased by end 42a of a spring 42 in the clockwise direction shown in FIG. 5. The crooked end 32a is in contact with the arm 39. The actuating lever 34 is rotatable on a shaft 45, and has a receiving end 34a biased by the other end 42b of the spring 42 counterclockwise as shown in FIG. 5.

In the film 21 are formed perforations 21a well known in the art of photography. Each series of eight perforations 21a corresponds to the length of a picture frame on the film 21. The driven sprocket 38 has eight radially projecting teeth and is rotated by the film 21 which in turn is advanced by the rotation of the wheel 18, so as to make one revolution per frame on the film 21. Cams 44 and 52 are formed integrally and coaxially with the driven sprocket 38 and so rotate with the sprocket 38. A recess 44a is formed in the cam 44. The periphery of the cam 44 is in contact with a claw 32c of the retaining lever 32. The periphery of the cam 52 is in contact with a claw 34c of the actuating lever 34.

One revolution of the cam 52 swings clockwise the actuating lever 34, of which a rod 34d is engaged with a projection 32d of the retaining lever 32. The claw 32c of the retaining lever 32 is engaged with the recess 44a in the cam 44, so as to stop the winding up movement of the wind-up wheel 18. Then the shutter mechanism is cocked fully.

When the shutter button 17 is depressed, the arm 39 swings the retaining lever 32 counterclockwise. The projection 32d is disengaged from the rod 34d of the actuating lever 34. An arm 34b of the lever 34 kicks away a claw 47c of the shutter blade 47, so as to swing the shutter blade 47 clockwise about a shaft 47a until a shutter aperture 49 is open. When the arm 34b rides over and passes over the claw 47c, the shutter blade 47 is pulled back in its initial position by a spring 48 until the shutter aperture 49 is closed. The taking lens 15 is mounted in front of the shutter aperture 49 on a shutter cover 50 disposed in front of the shutter blade 47.

After completing the release of the shutter, the claw 34c of the actuating lever 34 is in contact with a stepped face 52a of the cam 52. The notch in the retaining lever 32 next to the projection 32d contains the rod 34d. The claw 32c is no longer in contact with the periphery of the cam 44. The next time the wheel 18 is turned, the cams 44 and 52 rotate integrally with the driven sprocket 38. Rotation of the cam 52 swings the actuating lever 34 clockwise. The retaining lever 32 is swung clockwise by the bias of the spring 42. The retaining lever 32 and the actuating lever 34 assume again the fully cocked position.

The retaining lever 32 is provided with a ratchet or claw 32b, which engages with the teeth 18b around the wheel 18 at the end of winding a film frame, so as to prevent the wheel 18 from being further rotated. The claw 32b, after the next release of the shutter, retreats from wheel teeth 18a, and allows the wheel 18 to rotate.

On the shaft of the driven sprocket 38 is formed coaxially a one-toothed gear 54 (FIG. 5). The one-toothed gear 54 is in mesh with teeth 30a about the count-indicating wheel 30. When the driven sprocket 38 making one revolution, the gear 54 does the same, so as to rotate the wheel 30 by one counting mark. The upper surface of the count-indicating wheel 30 is provided with a scale which is defined in correspondence with the pitch of rotation of wheel 30 and indicates the number of the next frame, up to the standard maximum number of photographable frames of such films. The scale indicates the remaining number of photographable frames. The current count on the scale is visible externally through the indicator window 19 (see FIG. 2) so that the number of remaining photographable frames can thus be known.

A claw 57 is formed under the count-indicating wheel 30 integrally therewith. During a wind-up after the exposure of a final frame on the film 21, the claw 57 comes into contact with a raised end 32e of the retaining lever 32, and prevents the retaining lever 32 from rotating so as to keep the claw 32c from entering the recess 44a. An untoothed arc 30b on the wheel 30 reaches a position wherein the one-toothed gear 54 would otherwise be in mesh. The retaining lever 32 assuming such a position, the driven sprocket 38 is set free. Even when the one-toothed gear 54 rotates, the wheel 30 does not rotate further. The wind-up wheel 18 is now free to rotate. Accordingly, a frame of the film 21 will be wound up into the cassette shell 22.

Figure 6:
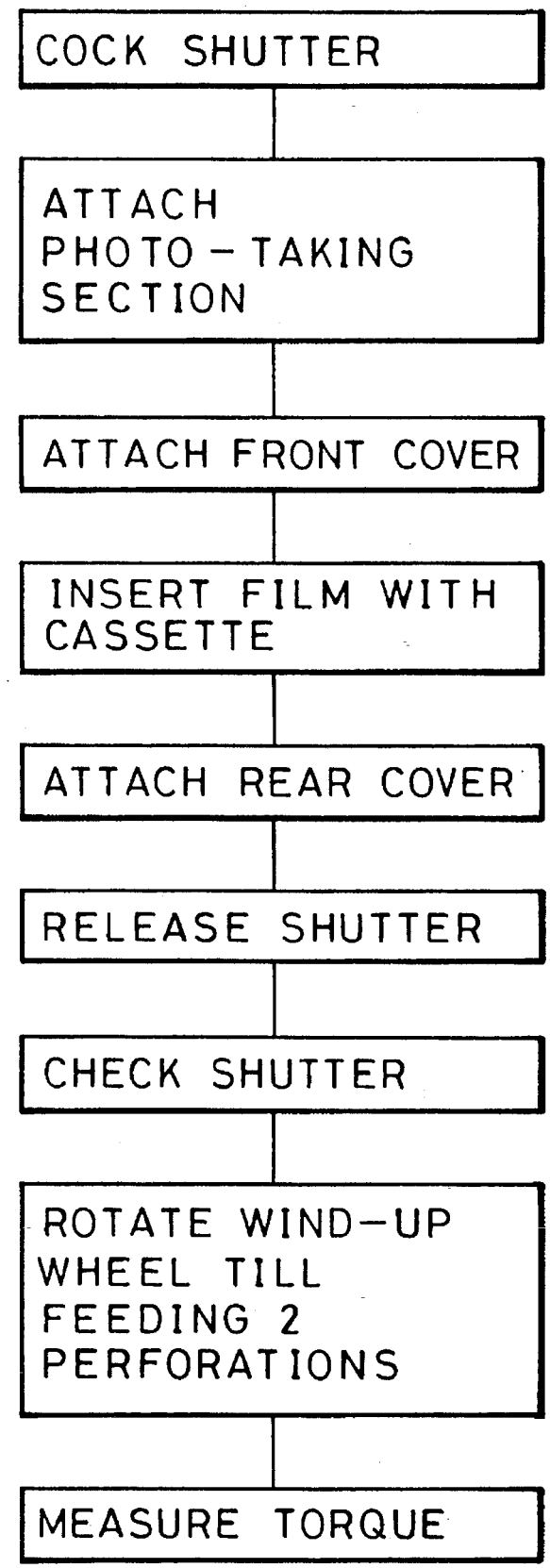
FIG. 6 is a flow chart illustrating a novel process of manufacturing the film unit.

The operation of assembly of the above-constructed lens-fitted photographic film unit will now be described, particularly referring to the flow chart of FIG. 6. The mechanical section 27 is first assembled. The driven sprocket 38 is rotated in the direction of winding up of the film 21 so as to cock the shutter. The mechanical section 27 with the shutter cocked is attached to the film-containing section 26, to complete the main body 12. The front cover 13 is attached to the main body 12. Note that it is possible to attach the mechanical section 27 to the film-containing section 26 before cocking the shutter.

The roll of the film 21 is fitted on the drive shaft 61, while the spool 22a in the cassette shell 22 is fitted on the driven shaft 60. The roll of the film 21 and the cassette shell 22 are inserted together into the main body 12, respectively into the film supply chamber 23 and the cassette-containing chamber 24. With the rear cover 14 attached to the main body 12, the shafts 60 and 61 are detached and withdrawn. The bottom lids 14a and 14b are closed to close the inside of the chambers 23 and 24, whereupon the film housing 11 of the film unit is completed.

The film housing 11 now has a condition wherein the driven sprocket 38 is engaged with the perforations 21a through the slot 29. The film 21 is so arranged that four perforations are located between the exposure aperture 28a of the exposure chamber 28 and the passage mouth 22b of the cassette shell 22 in the cassette-containing chamber 24. The film 21 is so drawn out of the cassette shell 22 that a distance L0 corresponds to 16 sequential perforations, wherein L0 is the distance from the film passage mouth 22b to an edge number E as recorded on the film 21 by a previous exposure.

Figure 7:
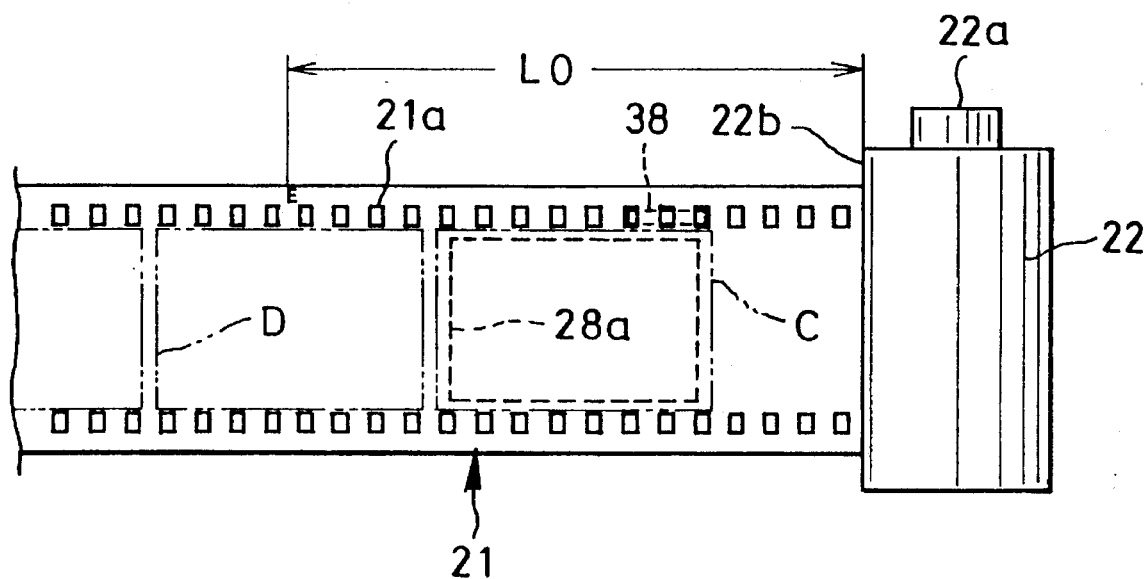
FIG. 7 is an explanatory plan view, illustrating the condition of the film loaded in the film unit during the novel manufacturing process, before inspection of the shutter mechanism.
Figure 8:
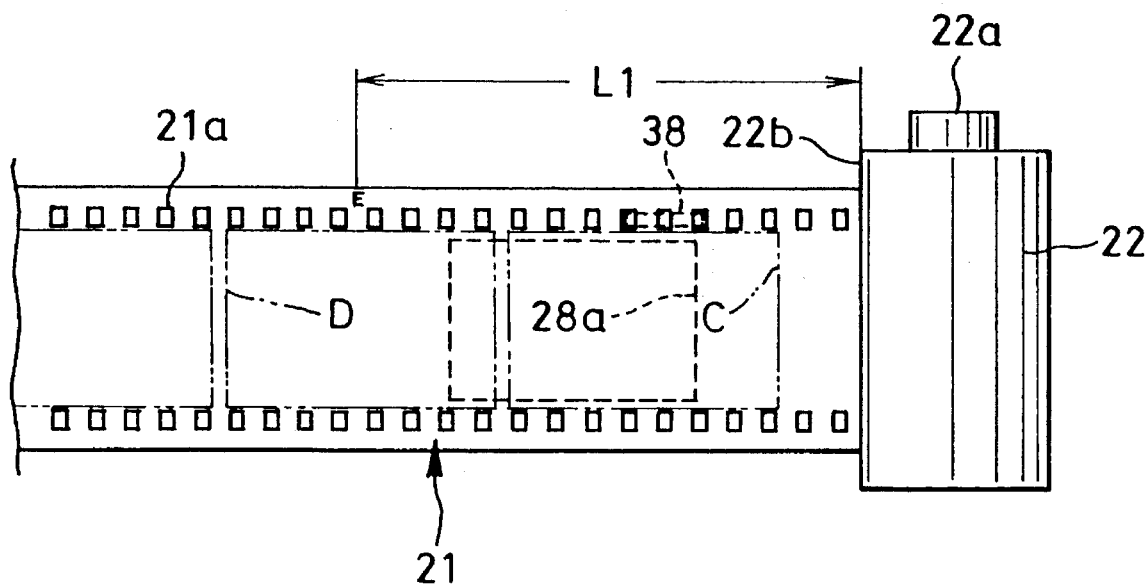
FIG. 8 is a view similar to FIG. 7, illustrating the condition of the film loaded in the film unit, after the inspection of the shutter mechanism.

The film housing 11 is then subjected to inspection. To inspect the film housing 11, the shutter button 17 is depressed to release the shutter, so that the actuation of the shutter blade 47 is checked. If the film unit incorporates an electronic flash, the actuation of the flash is also checked. Inspection of actuation of the shutter causes an exposure of the film 21 in the range C as shown in correspondence with the exposure chamber 28, as illustrated in FIG. 7. Then the wind-up wheel 18 is rotated in the wind-up direction for the purpose of measurement and evaluation of the torque required to rotate the wheel 18. The rotation of the wheel 18 for torque measurement is performed over a distance corresponding to feeding two perforations in the film 21, until the state as illustrated in FIG. 8 is reached. The film housing 11 in this condition is packaged in the outer casing 10. The film unit to be shipped, therefore, has the film 21 so drawn out of the cassette shell 22 that a distance L1 corresponds to 14 sequential perforations, wherein L1 is the distance between the film passage mouth 22b and the edge number E. Note that, although the perforations 21a are covered and hidden by the rear cover 14, it has been previously determined how much the wind-up wheel 18 is to be rotated in correspondence with the rotational amount of sprocket 38.

After shipment of the film unit, there is a possibility that the film unit may be subjected to severe conditions of high temperature, e.g. by a purchaser who puts it on a dashboard in an automobile in midsummer. Should the shutter remain fully cocked during shipment of the film unit, such a high temperature would cause deformation between parts of the film unit and stresses interacting between them, e.g. between plastic parts, or between a metallic part (spring 42) and a plastic part (actuating lever 34). However, no such problem takes place in the present invention, because the relevant mechanisms are displaced, not into the cocked position, but into an incompletely cocked position short of the fully cocked position, in other words, two perforations short of fully cocked.

For a user to take a first photograph by use of the film unit, the film 21 is wound up by six perforations to position a first frame D as illustrated in FIGS. 7 and 8, until the shutter mechanism is charged. The frame D is the particular frame that is associated with the edge number E printed on the lengthwise midportion of the frame, edgewise outside the perforations 21a. After development of the film 21, respective picture frames on the whole film 21 are associated with an edge number as E, 24, 23, . . . , 2, 1 without accidental deviation in position. This is favorable because a photofinisher can find easily the picture frames selected by the user or customer, when he orders from the photofinisher extra prints of the selected frames, and because no mistake in designating picture frames will take place.

In the present invention, the rotation of the wheel 18 for torque measurement is effected in the amount corresponding to feeding two perforations of the film 21. Alternatively, such rotation for torque measurement may be by an amount corresponding to feeding from one to seven perforations, which should in any event be fewer than eight, that is, an amount less than moves the parts to the fully cocked position.

The above embodiment of the method is constituted by the steps of cocking the shutter mechanism, secondly loading the main body with the film, thirdly checking the operation of the shutter mechanism by releasing the shutter mechanism, and then measuring the torque of rotating the wind-up wheel by rotating the wind-up wheel by an amount corresponding to feeding one to seven perforations.

Figure 9:
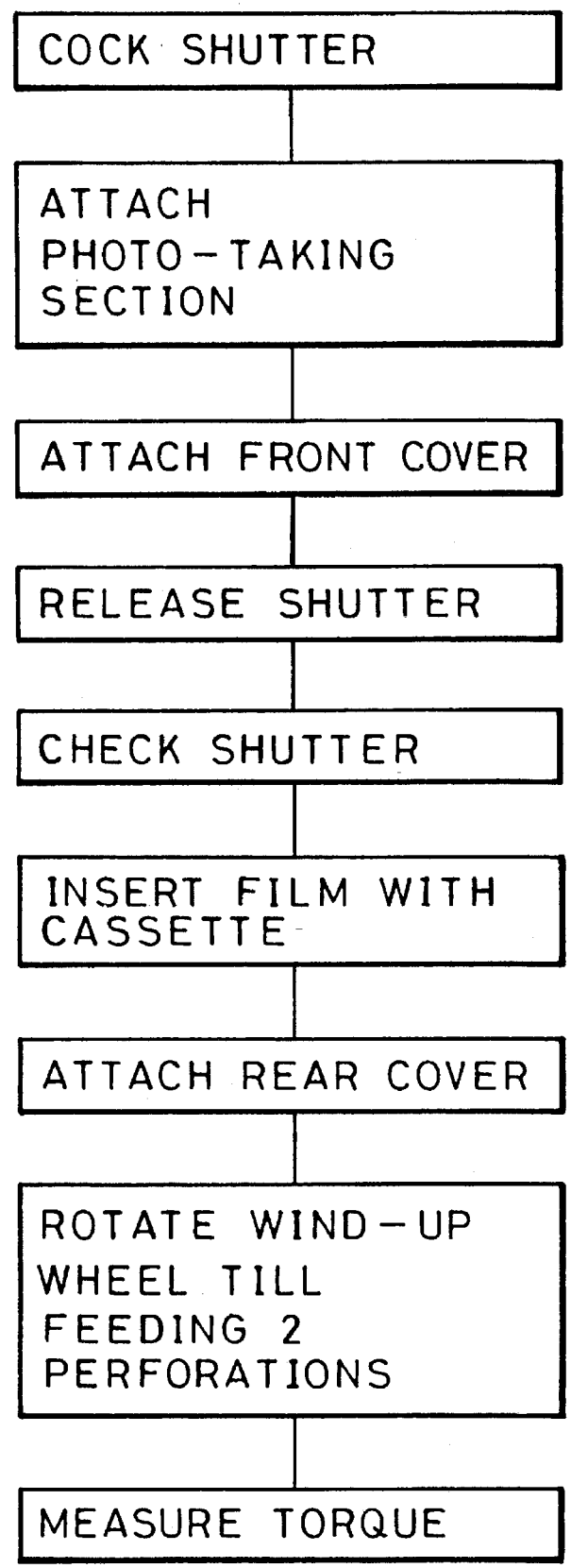
FIG. 9 is a flow chart illustrating another preferred novel process of manufacturing the film unit.

Alternatively, the present invention may be constituted as illustrated in FIG. 9, by the steps of checking the operation of the shutter mechanism by cocking and releasing the shutter mechanism, secondly loading the main body with the film, and then measuring the torque of rotating the wind-up wheel by rotating the wind-up wheel by an amount corresponding to feeding one to seven perforations.

Figure 10:
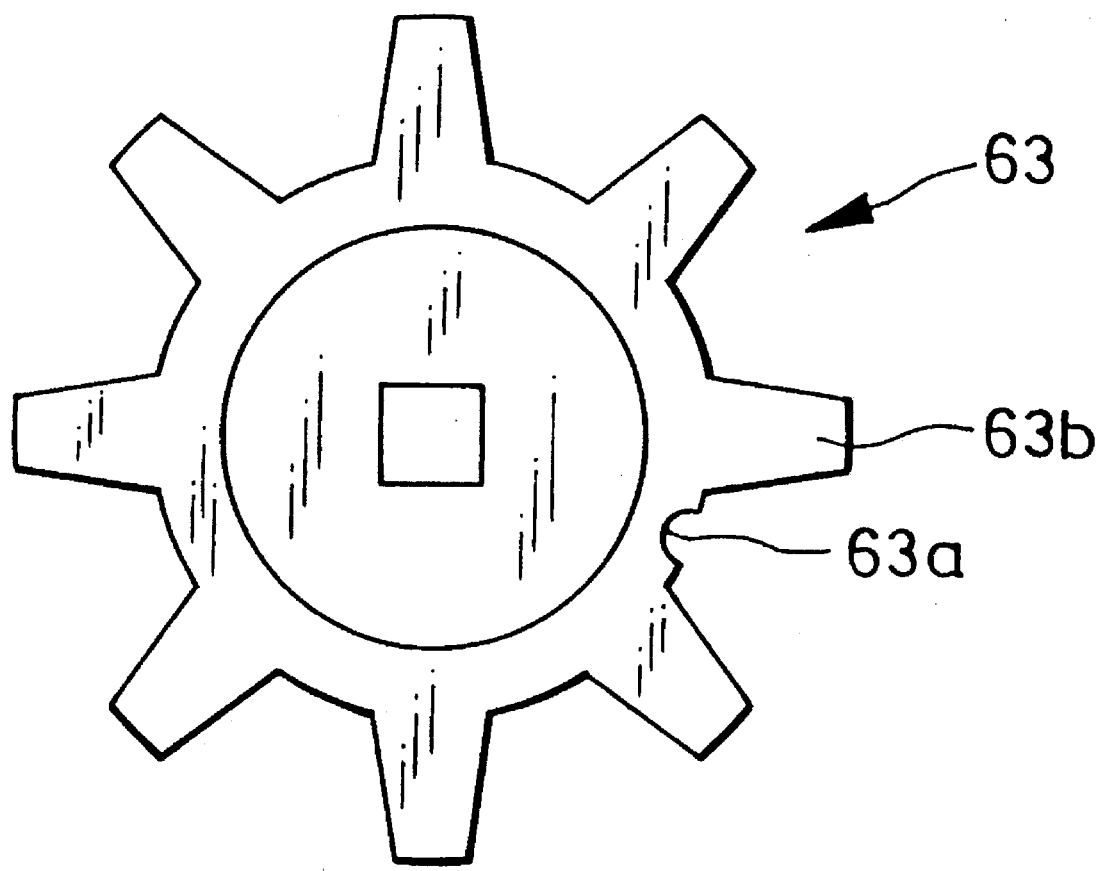
FIG. 10 is a view of a driven sprocket wheel to be used in another preferred film unit.
Figure 11:
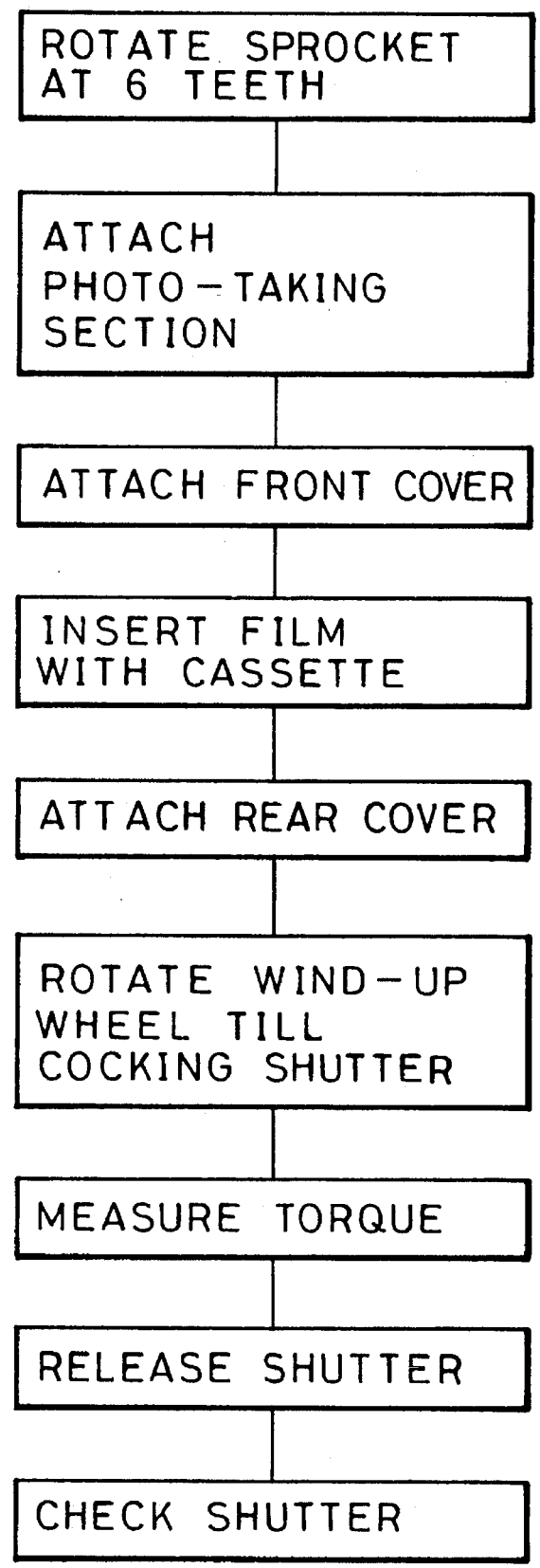
FIG. 11 is a flow chart illustrating still another preferred novel process of manufacturing the film unit.

Another preferred method of assembly of a lens-fitted photographic film unit will next be described, referring to FIGS. 10 and 11. After the mechanical section 27 is assembled, a driven sprocket 63 is rotated in the direction of winding up of the film 21 so as to rotate the sprocket 63 into a halfway position, wherein the sprocket has not been rotated to the end position of one winding-up but stops two perforations short of the winding-up end position. The driven sprocket 63 has a notch 63a as illustrated in FIG. 10, which marks the original position of rotation of the sprocket 63 and is used for a manual setting of the driven sprocket 63 into a predetermined rotational position when an operator assembles the film unit in a factory. The mechanical section 27 with the shutter cocked is attached to the film-containing section, to complete the main body 12. The front cover 13 is attached to the main body 12. Note that it is possible to attach the mechanical section 27 to the film-containing section before cocking the shutter.

The roll of the film 21 and the cassette shell 22 are inserted together respectively into the film supply chamber 23 and the cassette-containing chamber 24. With the rear cover 14 attached to the main body 12, the film housing 11 of the film unit is completed in a manner similar to the above.

The film housing 11 now has the condition wherein the driven sprocket 63 is engaged with the perforations 21a. The film 21 is so arranged that from one to three perforations, preferably two, are located between the exposure aperture 68a of the exposure chamber 68 and the passage mouth 22b of the cassette shell 22 contained in the cassette-containing chamber 24. The film 21 is so drawn out of the cassette shell 22 that the distance L0 corresponds to 16 perforations.

Figure 13:
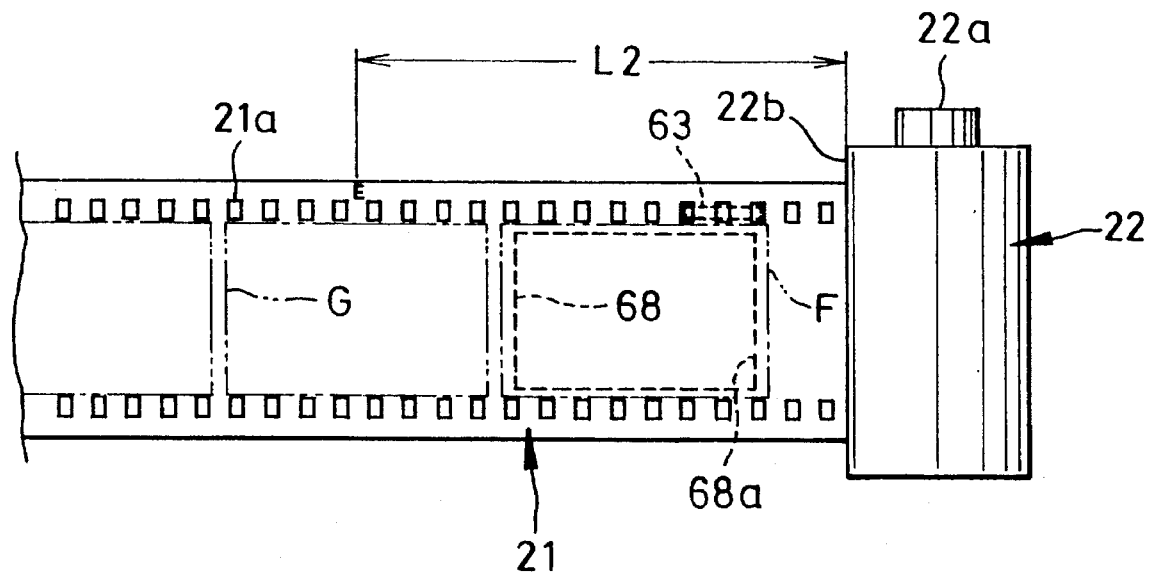
FIG. 13 is a view similar to FIG. 8, illustrating the condition of the film loaded in the film unit in the process of FIG. 11, after inspection of the shutter mechanism.

To inspect the film housing 11, the wind-up wheel 18 is rotated in the wind-up direction for the purpose of measuring the torque required for rotating the wheel 18. The rotation of the wheel 18 for torque measurement is by an amount corresponding to feeding two perforations in the film 21, so that the shutter assumes the fully cocked position. The position of the film 21 at this time is illustrated in FIG. 13. The shutter button 17 is depressed to release the shutter, so that the actuation of the shutter blade 47 can be checked. This inspection of the shutter operation exposes the film 21 in the area F in correspondence with the exposure chamber 68, as illustrated in FIG. 13. Accordingly, even a high temperature never causes deformation between parts of the film unit with stresses between them, because the relevant mechanisms are in a stand-by position assumed immediately upon release of the shutter. The film housing 11 in this condition is packaged in the outer casing 10. The film unit to be shipped, therefore, has the film 21 so drawn out of the cassette shell 22 that the distance L2 corresponds to 14 perforations, wherein L2 is the distance between the film passage mouth 22b and the edge number E.

Figure 12:
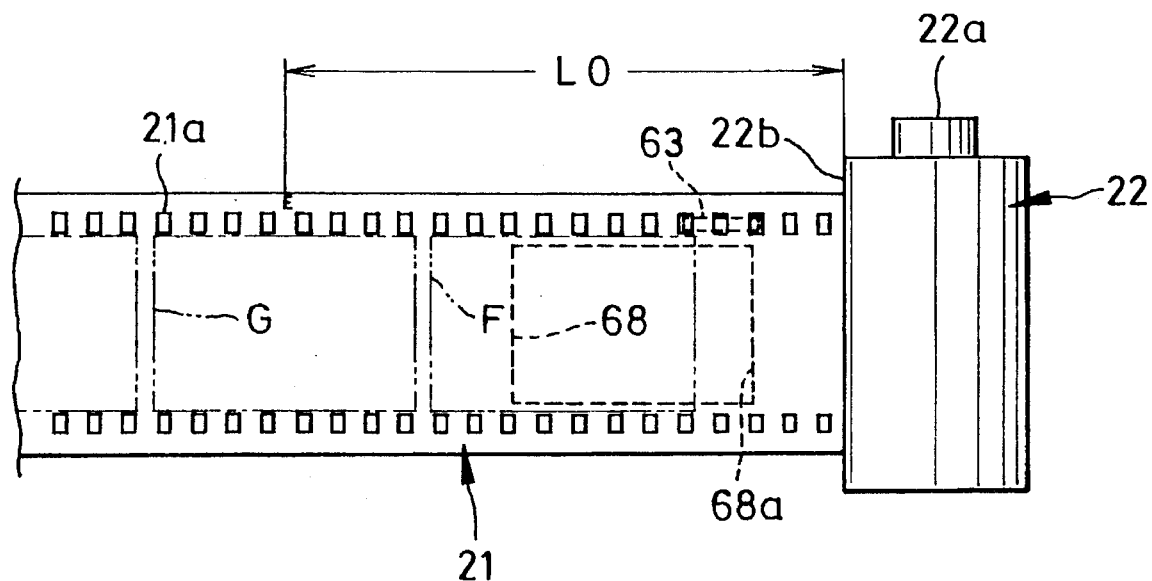
FIG. 12 is a view similar to FIG. 7, illustrating the condition of the film loaded in the film unit during the novel manufacturing process of FIG. 11, before inspection of the shutter mechanism.

For a user to take the first photograph by use of the film unit, the film 21 is wound up by eight perforations for positioning a first frame G in alignment with exposure chamber 68, as illustrated in FIGS. 12 and 13, whereby the shutter mechanism is cocked. The frame G is associated with the edge number E printed on the lengthwise midportion of the frame.

In the present invention, the driven sprocket 63, before loading of the film 21, is displaced into the halfway position wherein the sprocket is two perforations short of the winding-up end position. Alternatively, such displacement before film loading may be into a halfway position wherein the sprocket leaves from one to seven perforations short of the winding-up end position. The rotation of the wheel 18 for torque measurement may be by a suitable amount.

Figure 14:
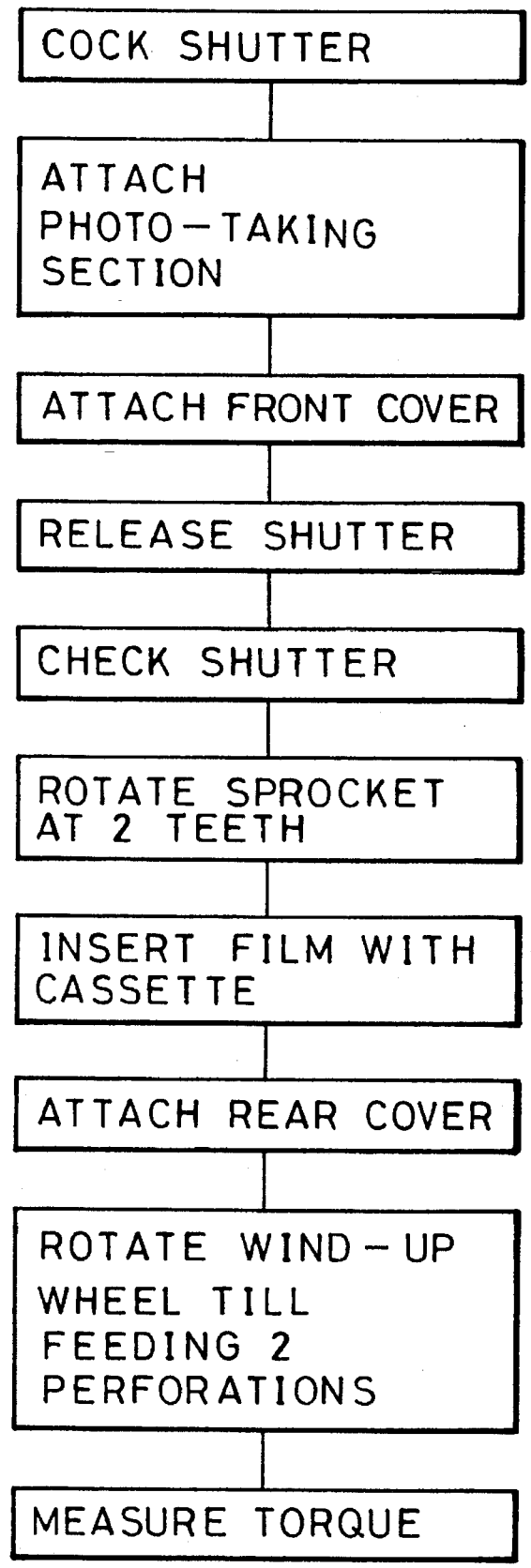
FIG. 14 is a flow chart illustrating a further preferred novel process of manufacturing the film unit.

In the above embodiment, the film 21 is loaded into the main body before the operation of the shutter mechanism is checked. Alternatively, the operation of the shutter mechanism can be checked before the film 21 is loaded into the main body, as illustrated by the flow chart of FIG. 14. This is advantageous in that no frame need be spent only for testing the shutter mechanism.

Note that, when a greater number of frames are recorded on the strip of the film of a standard length according to ISO than the stated number of photographic frames (such as 36, 24 or 12 exposures), the interval between the frame nearest to the film leader and the end of the film leader is shorter than that of the film in a conventional instance. To process the film, the film leader must be drawn out. However, after such an economical use, drawing out the film leader by the usual amount might subject the leading first frame to ambient light. To avoid this, however, it is insufficient to predetermine the length of film leader to be drawn out in the course of development. To define the interval between the leading first frame of the film and the end of the film leader, it is necessary to position the film relative to the driven sprocket associated with cocking of the shutter.

Figure 15:
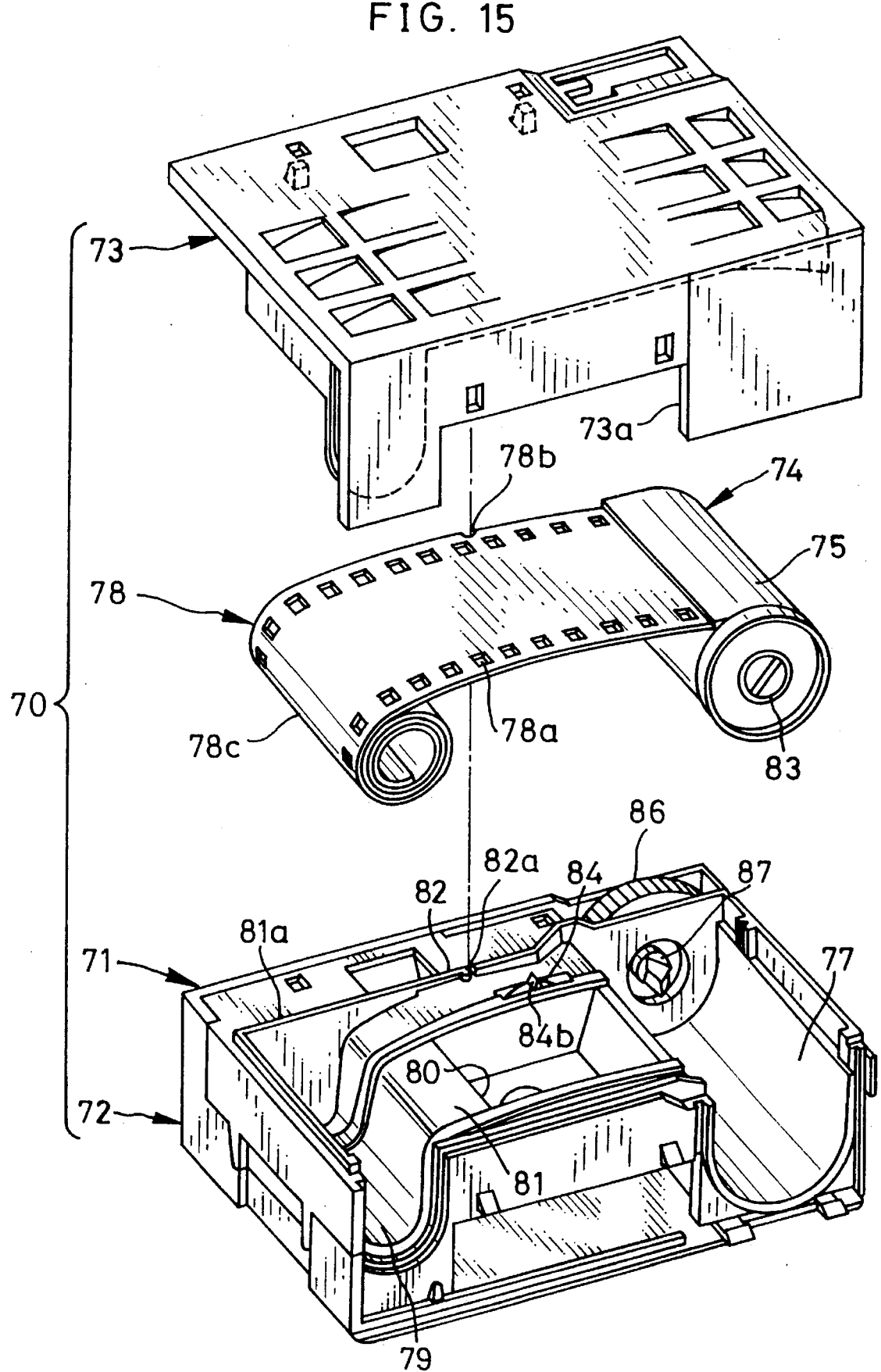
FIG. 15 is an exploded perspective view illustrating still another preferred film unit.
Figure 16:
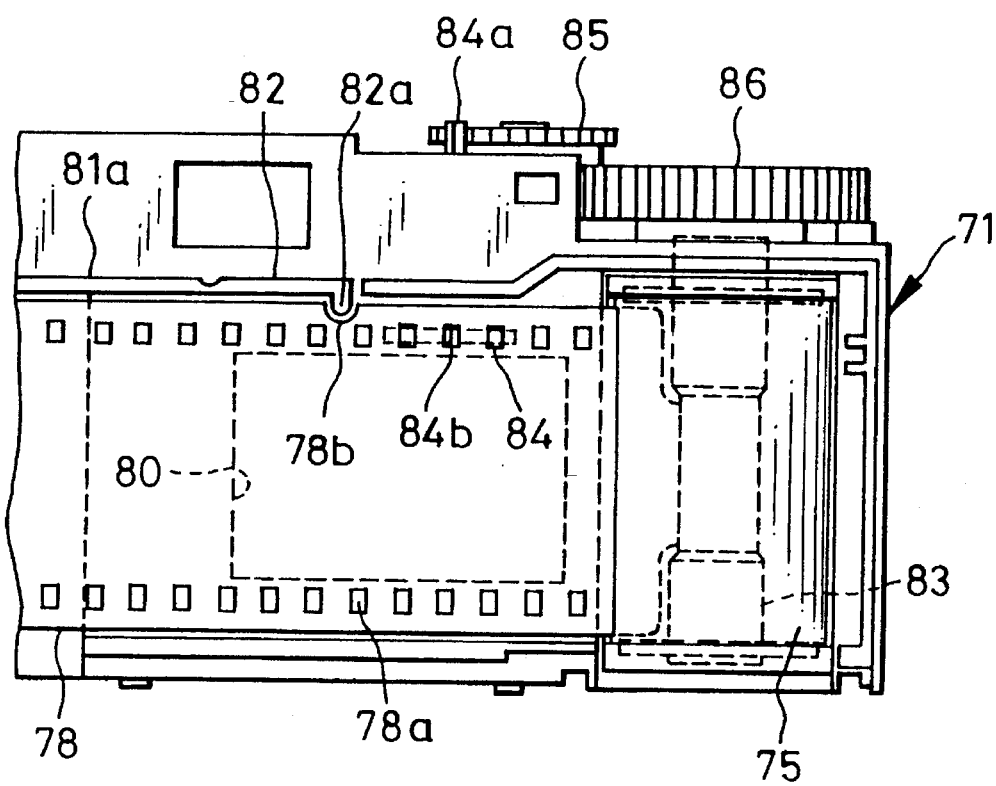
FIG. 16 is a rear elevational view, illustrating the relative positions of a shiftable portion and the film upon being loaded.
Figure 17:
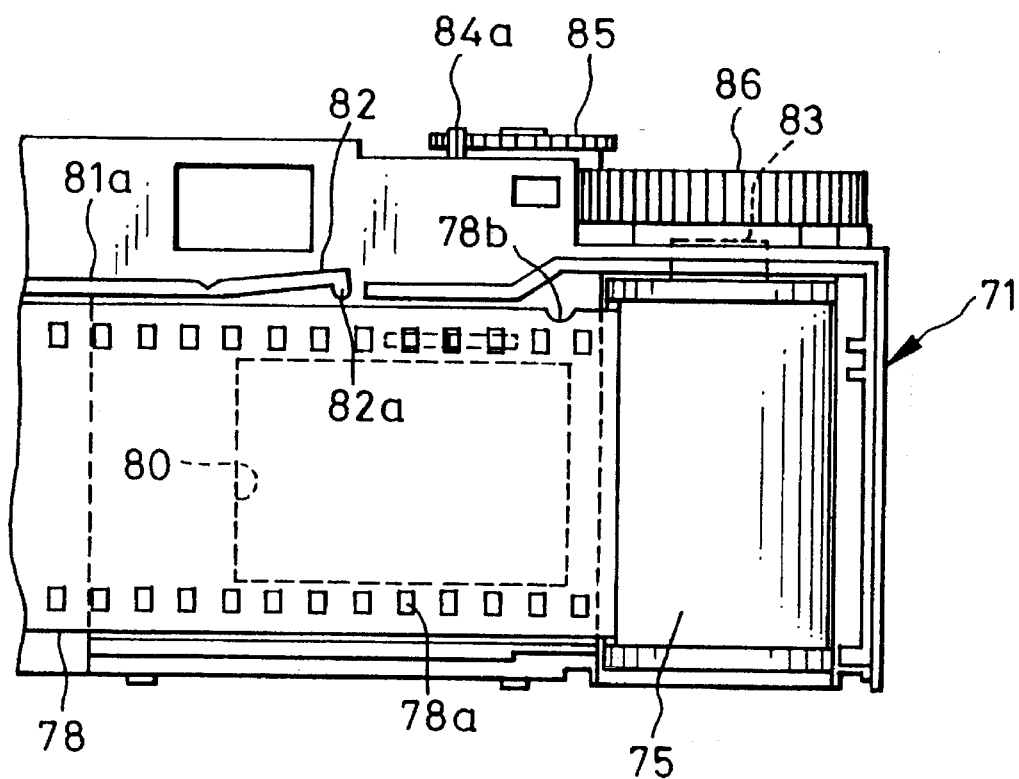
FIG. 17 is a view similar to FIG. 16, illustrating the relative positions of the shiftable portion and the film starting to be wound up.
Figure 18:
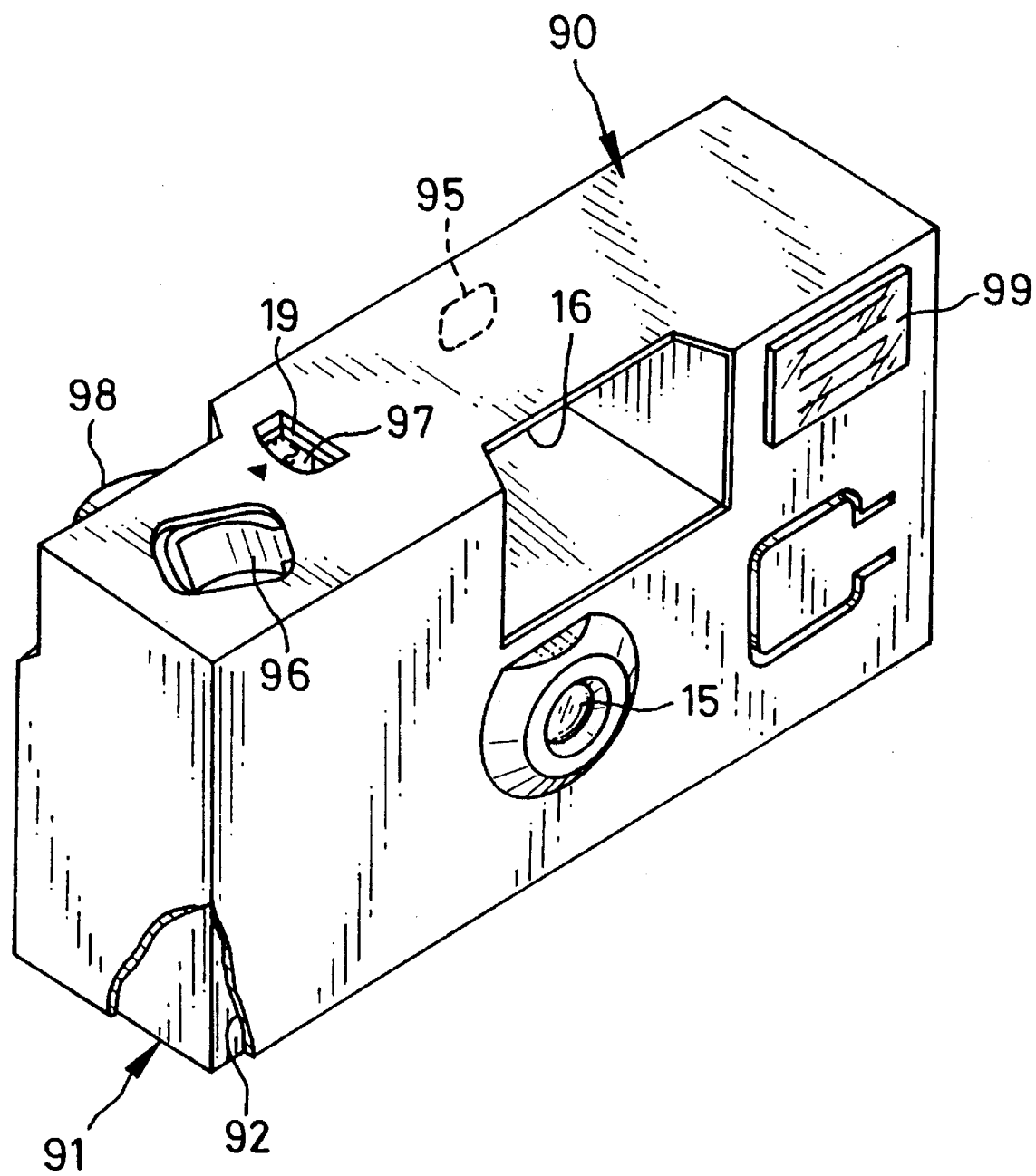
FIG. 18 is a perspective view illustrating another preferred embodiment.
Figure 19:
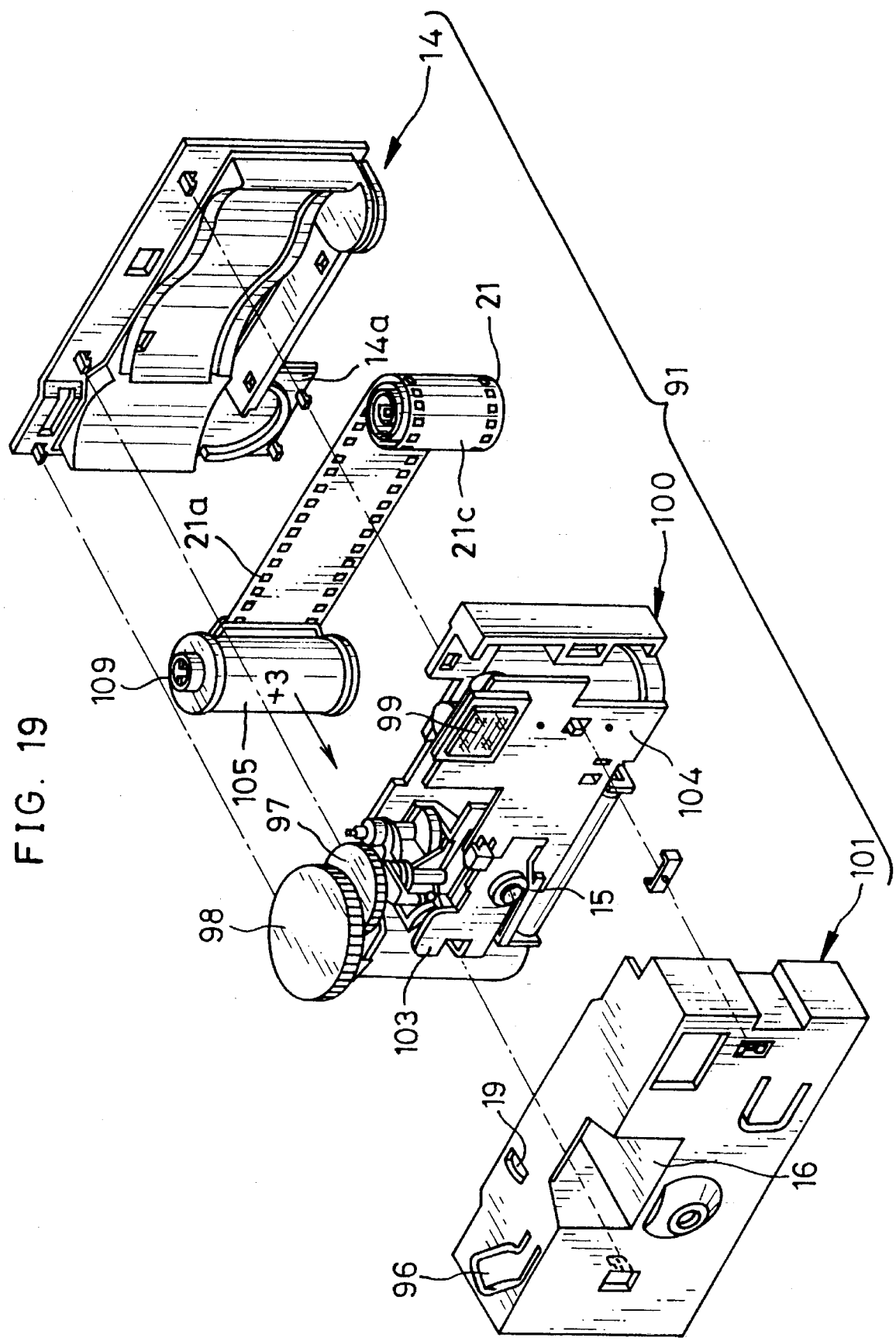
FIG. 19 is an exploded perspective view illustrating the film housing of the embodiment of FIG. 18.

FIGS. 15 to 17 illustrate an embodiment for solving this problem. The film housing 70 of a lens-fitted photographic film unit has a film passageway 81, in front of which an exposure chamber 80 is formed. The top of the passageway 81 is defined by a guide wall 81a, of which a portion 82 is formed to be shiftable. This shiftable portion 82 is provided with a projection 82a that projects into the passageway 81. Photographic film 78, for use in the present embodiment, is provided with a semi-circular notch 78b to be engaged with the projection 82a. The position of the notch 78b relative to the length of the film 78 is substantially in the trailer of the film 78, namely, near a spool 83 in cassette shell 75. The notch 78b receives the projection 82a, when the cassette shell 75 and the film 78 are loaded in chambers 77 and 79 while the film 78 is fully drawn out of the cassette shell 75, as illustrated in FIG. 16.

A driven sprocket 84 is arranged to project into the passageway 81, and is provided with a one-toothed gear 84a in the form of an upwardly extending shaft, which is engaged with teeth on a count-indicating wheel 85. When the film 78 is advanced by eight of the perforations 78a, the driven sprocket 84 is caused by the perforations 78a of the film 78 to make one revolution. Upon rotation of the one-toothed gear 84a, the count-indicating wheel 85 is rotated by one tooth until a wind-up wheel 86 is locked. Note that the main body 71 of the film housing 70 can be preferably constituted of photo-taking and film-containing sections, but also may be but a single section.

The assembly of this lens-fitted film unit will now be described. When attaching the shutter mechanism to the main body 71, the count-indicating wheel 85 is set in an initial position wherein a start mark S formed on the wheel 85 appears through an indicator window in the front cover 72. The driven sprocket 84, at the same time, has an angular position such that one of eight teeth 84b is directed perpendicularly to the film 78 for reliable engagement with one of the perforations 78a. The shiftable portion 82 is in a position aligned with the guide wall 81a, and the projection 82a projects into the passageway 81. With the main body 71 being in this state, the front cover 72 is attached to it.

The film 78 is fully drawn out of the cassette shell 75 in a darkroom and is wound in a roll 78c. The cassette shell 75 is inserted into the cassette-containing chamber 77 while the spool 83 is engaged with a fork 87. The film roll 78c is inserted into the film supply chamber 79 in such a way as to engage the notch 78b with the projection 82a, as illustrated in FIG. 16. Accordingly, the photographable length of the film 78 is set as predetermined. The amount of the film 78 advanced will correspond, without fail, to the count indicated by the wheel 85. To develop the film 78, the leader of the film 78 can be drawn out of the cassette shell 75, with precision as to the drawn out length. A greater number of frames having been recorded on the film 78 than the stated number of photographable frames, there is no fear of exposing to ambient light the extra frames on the film 78 exposed beyond the stated number.

After the main body 71 is loaded with the film 78, the rear cover 73 is attached to the main body 71, which is packaged in an outer casing to complete the film unit.

A user purchases the film unit. The start mark S on the wind-up wheel 86 appearing in the indicator window, the user operates the wheel 86 to wind up the film 78. As illustrated in FIG. 17, the projection 82a is pressed by the longitudinal edge of the film 78, which forces the shiftable portion 82 to swing upward. The projection 82a retracts from the passageway 81 so as to allow advance of the film 78.

The wind-up wheel 86, initially in the position "S", is rotated until it stops in a winding-up end position, wherein "27" on the count-indicating wheel 85 appears in the indicator window, as the maximum number of photographable frames. "27" represents 27 exposures, which are three frames added to 24 stated frames of the film 78.

These extra three frames include one extra frame on the film trailer on the side of the spool 83, and two extra frames on the film leader. The user, in due course, visibly recognizes all the 27 exposures as completed, and rotates the wind-up wheel 86 continuously until the cassette shell 75 finally contains most of the film 78.

When the user leaves the exposed film unit at a photofinishing agency for photofinishing, the agency forwards the user's film unit to a photo laboratory. An operation at the photo laboratory peels the outer casing partly away, opens a bottom lid 73a of the cassette-containing chamber 77, and removes from the film housing 70 a photographic film cassette 74 full of exposed film. A leader pulling machine is first used for withdrawing the film from the cassette 74. The leader is pulled out by this machine a predetermined amount, e.g. to pull out 14 of the perforations 78a in the film 78. The film 78 from the cassette shell 75 is set in an automatic developing machine, and processed by the developing steps in general use. The 27 exposures are thus safely developed, without risk that any of the extra three frames be accidentally subjected to ambient light.

In the above embodiment, the shiftable portion 82 is above the exposure chamber 80 on the side of the driven sprocket 84. Alternatively, such a shiftable portion for engagement may be below the exposure chamber 80 on a lower guide wall. The shape and construction of the shiftable portion 82 may be changed, e.g. it may be a spring or a member separate from the main body 71. The notch 78b in the film 78 is semi-circular. Alternatively, a notch of another shape, e.g. rectangular, may be formed in the film. To form the notch 78b as described above, a cutter for cutting the continuous 135 film into strips can incorporate a punch adapted to form the notch 78b. This simplifies manufacturing.

Figure 20:
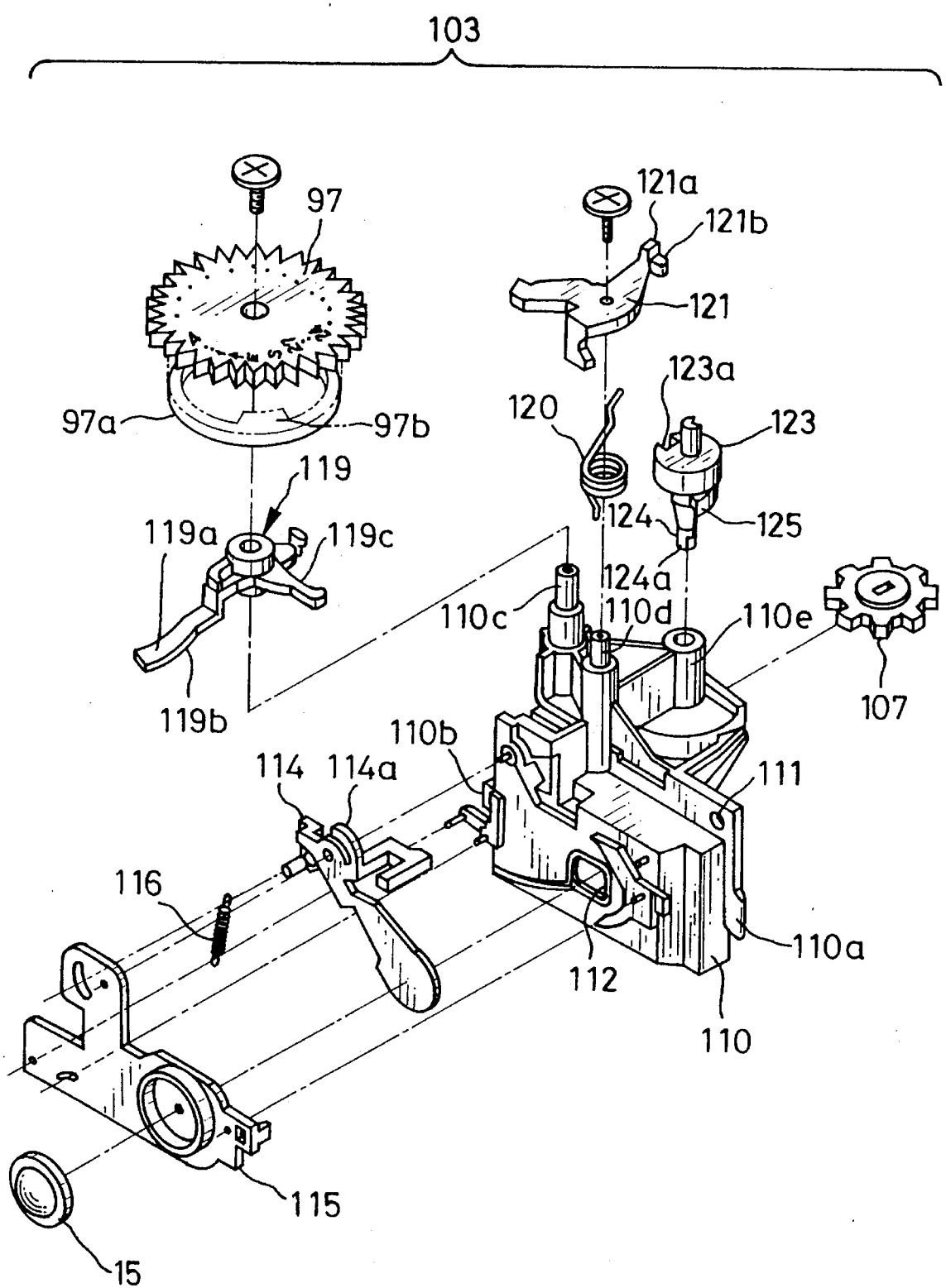
FIG. 20 is an exploded perspective view illustrating the photo-taking section of the embodiment of FIG. 18.
Figure 21:
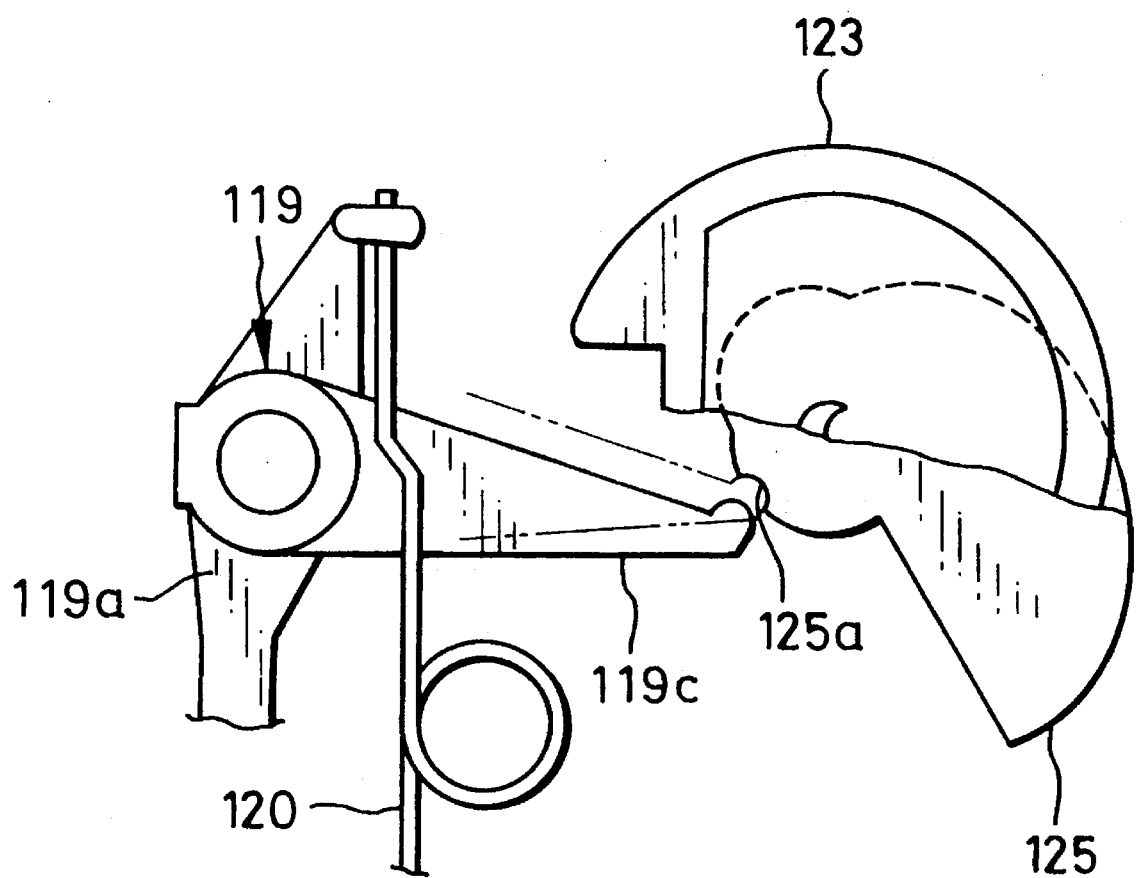
FIG. 21 is a plan view illustrating the relationship between the shutter cocking cam and the driven claw of the embodiment of FIG. 18.

FIGS. 18 to 21 illustrate another preferred embodiment, in which a cam 125 for cocking the shutter mechanism is provided with an engaging notch 125a, which has a shape adapted to receive a pointed end of a driven claw 119c. As illustrated in FIG. 21, immediately after releasing the shutter mechanism, the end of the driven claw 119c comes into clicking engagement with the notch 125a so as to stop the cam 125 from swinging. This is favorable during assembly, when a driven sprocket 107 is stopped in a specified position wherein the shutter mechanism is released. The film 21, completely drawn out of the cassette shell 105, is loaded while the sprocket 107 is stopped. Picture frames can be created on the film 21 in highly exact correspondence in positions identified by edge numbers recorded on the edge of the film 21. The length of the film 21, therefore, can be entirely used to the extent possible. Processed by the known developing processes, photographs in a number greater than the stated number of exposures can be obtained.

Figure 22:
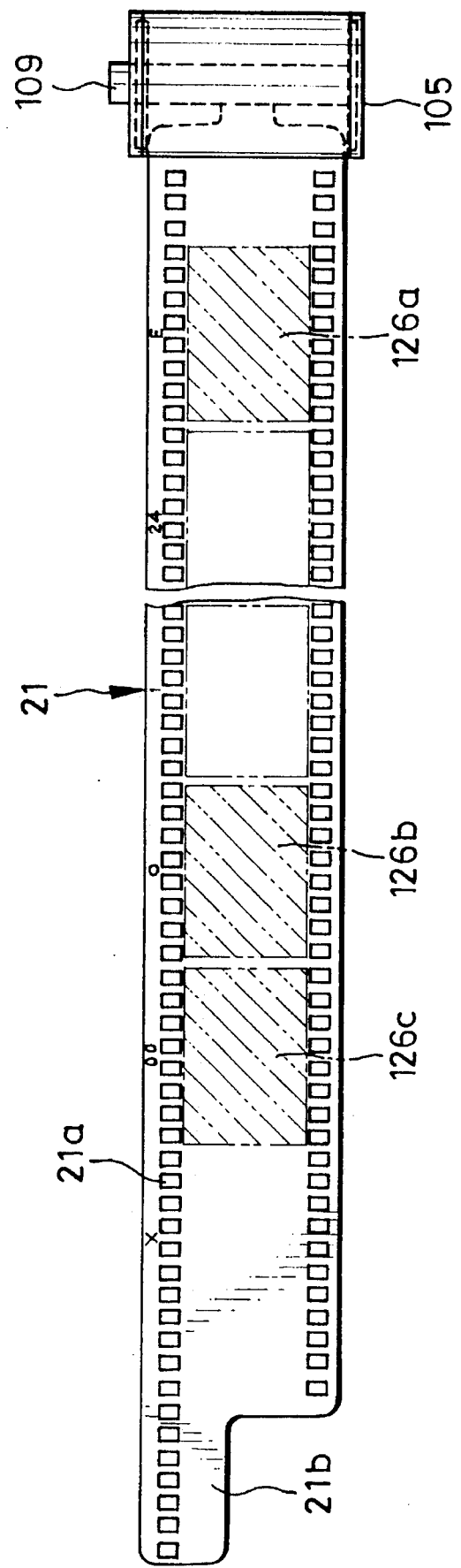
FIG. 22 is a plan view illustrating the photographic film contained in the film unit of FIG. 18.

The edge of the film 21, as illustrated in FIG. 22, is provided with the edge numbers X, 00, 0, 1, 2, . . . , 23, 24 and E, arranged in that order from the film leader 21b to the film trailer at a constant pitch and recorded as latent images by preparatory exposure. The edge numbers are rendered visible when the film 21 is developed. An empty or blank area 126a corresponding to the edge number E is used for a first exposure of the film 21. An area 126b corresponding to the edge number zero (0) is used for a 26th exposure of the film 21. An area 126c corresponding to the edge number double zero (00) is used for a 27th exposure of the film 21. The upper surface of the count-indicating wheel or counter wheel 97 has a peripheral series of numbers respectively indicating the remaining photographable number of frames, such as "27 . . . 24 . . . 1" between a starting sign S and an ending sign E. The outside of a cassette shell 105 is provided with a numerical sign such as a printed "+3", which is used for convenience in informing the photofinisher that the cassette shell 105 contains the film 21 exposed for 27 photographs despite the designation 24 exposures.

Figure 28:
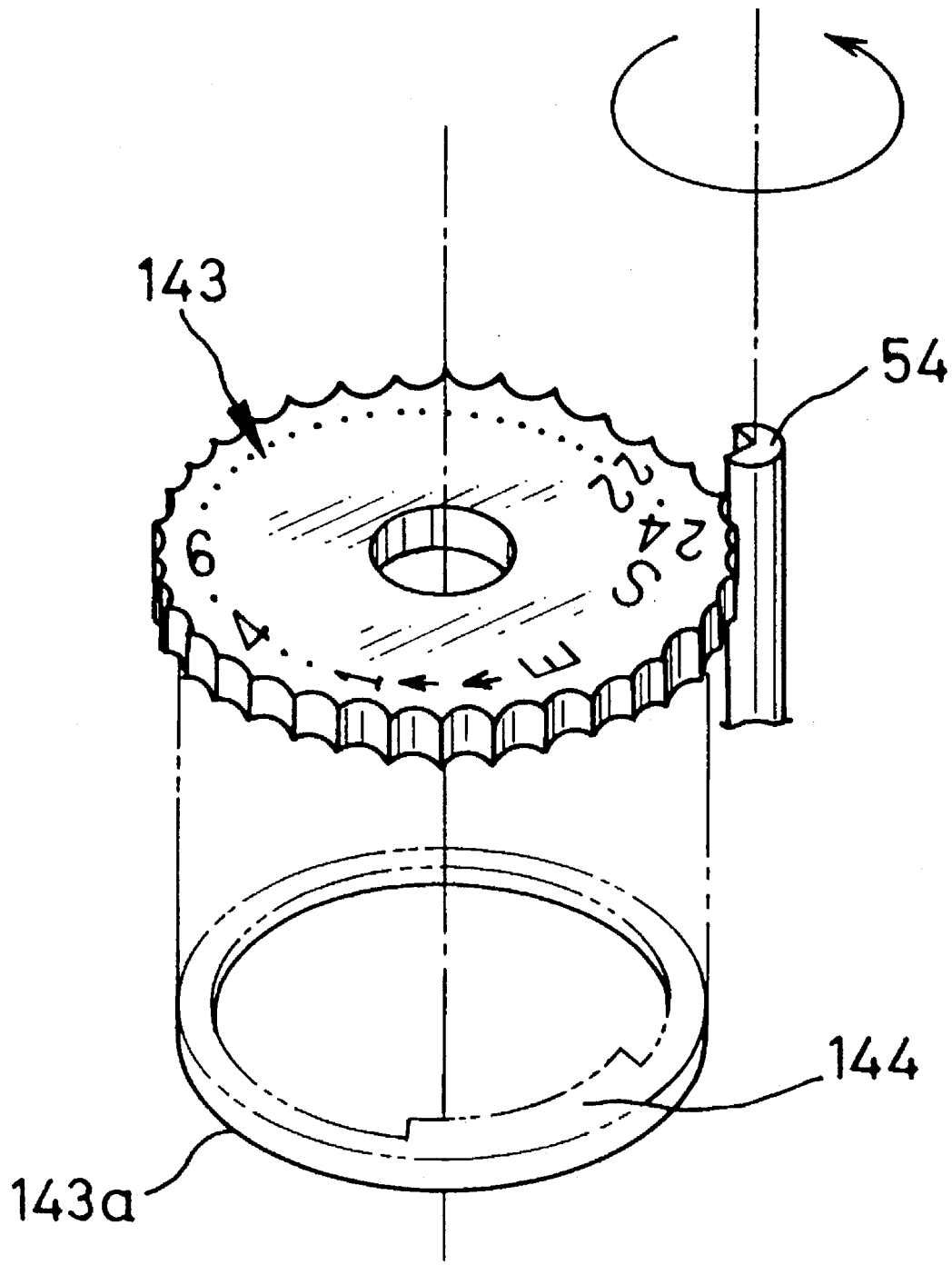
FIG. 28 is a perspective view illustrating a conventional counter wheel incorporated in a prior art film unit.

The lower surface of the counter wheel 97 is provided with an annular ridge 97a, and a claw 97b, as disabling mechanism, projecting inwardly from the ridge 97a. The claw 97b, during winding-up after the exposure of a final or 27th frame on the film, comes into contact with a raised end 121a of a retaining lever 121, and prevents the retaining lever 121 from rotating so as to keep a claw 121b from entering a recess 123a in a cam 123. The retaining lever 121 assuming such a position, the driven sprocket 107 is set free. A winding-up wheel 98 is now free to wind up. Accordingly, the leader-side remaining portion of the film can be completely wound up into the cassette shell 105. As illustrated in FIG. 22, the final two picture frames are created in the originally blank areas 126b and 126c, so that the leader-side remaining portion is shorter than that on the film used in a conventional film unit. Correspondingly, the length or angular range of the claw 97b is less than that of a claw 144 of a conventional counter wheel 143 as illustrated in FIG. 28. Note that, in FIGS. 20 and 28, the ridge 97a and the claw 97b are depicted separate from the counter wheel 97 for convenience, with a ridge 143a and the claw 144 similarly depicted separate from the counter wheel 143.

Note that, through a sleeve 110e, a shaft 124 of the cams 123 and 125 is inserted. The shaft 124 has an end 124a fitting in the sprocket 107.

Figure 23:
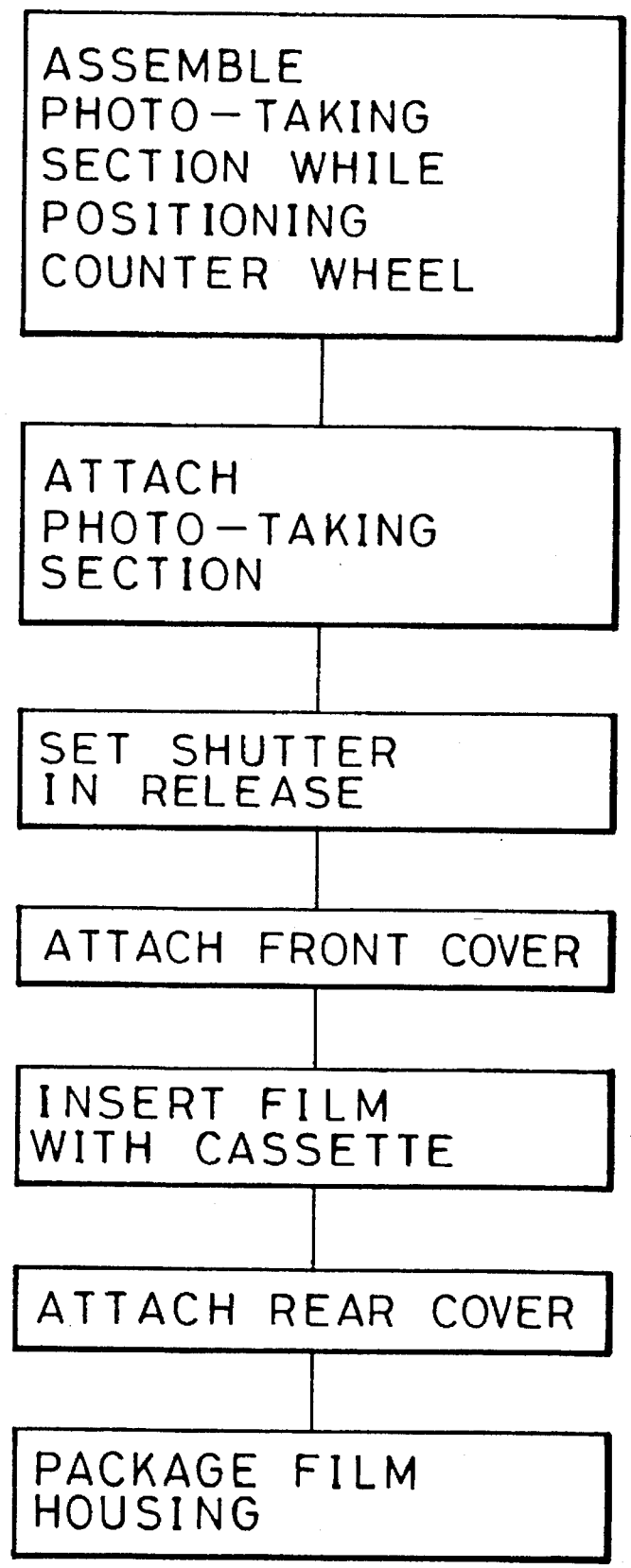
FIG. 23 is a flow chart illustrating the assembly of the film unit.

Referring to FIGS. 22 and 23, the assembly of a novel lens-fitted photographic film unit 90 will now be described. To assemble a photo-taking section 103, the counter wheel 97 is rotated to show the starting sign S as original position in the indicator window 19 (see FIGS. 18 and 19). The shutter mechanism is in its released position, namely in its position wherein an actuating lever 119 has so rotated counterclockwise under the bias of the spring 120 as to engage the driven claw 119c with the notch 125a in the cam 125. The driven sprocket 107 remains stopped by clicking of the driven claw 119c into the notch 125a.

The photo-taking unit 103 is attached to a main body 100. A front cover 101 is next attached to the main body 100, which is then conveyed into a darkroom of the factory. In the same way as illustrated in FIG. 4, the film leader 21b of the film 21 is fitted on the drive shaft 61 as a jig, while a spool 109 in the cassette shell 105 is fitted on the driven shaft 60 as a jig. The shafts 60 and 61 are rotated in synchronism, simultaneously and in the same direction. The film 21 is pulled out of the cassette shell 105, while being wound into a roll 21c of film 21 about the drive shaft 61. When the film 21 is pulled out to nearly its entire length, the roll of the film 21 and the cassette shell 105 are inserted together into the main body 100, respectively into the film supply chamber 23 and the cassette-containing chamber 24. The sprocket 107 having been positioned rotationally, the position of the perforations 22a relative to the sprocket 107 is precisely determined without the possibility of accidental change.

With the rear cover 14 attached to the main body 100, the shafts 60 and 61 are detached and withdrawn. The chambers 23 and 24 are closed. A film housing 91 is thus obtained, and is packaged in an outer casing 92 to be the film unit 90. Note that the outer casing 92 is adapted to impart a neat appearance to the lens-fitted photographic film unit 90 and consists of a paper box or carton, which may alternatively be a plastic sheet. To a flash-emitting section 99, an electronic flash device 104 is connected. To the main body 100, the rear cover 102 is attached, removably due to the engagement of conventional claws.

A user who has purchased the film unit 90 rotates the winding-up wheel 98 for taking a photograph. While the film 21 is being wound into the cassette shell 105, the perforations 22a of the advancing film move the teeth of the sprocket 107 to rotate it, whereby the cam 125 is rotated. The rotation of the cam 125 retracts the end of the driven claw 119c from within the notch 125a, against the clicked engagement between the notch 125a and the driven claw 119c. Now the sprocket 107 and the cam 125 are free to move beyond the notch 125a.

The film 21 further rotates the sprocket 107 and thus the cam 125. The driven claw 119c is in continuous contact with, and is pressed by, the periphery of the cam 125, so as to swing an arm 119a of the actuating lever 119 toward the cocked position. The arm 119a, during contact with a claw 114a of a shutter blade 114, rides over and passes over the claw 114a while the arm 119a is deformed by the claw 114a. When the arm 119a reaches the cocked position, the retaining lever 121 locks the actuating lever 119. The claw 121b of the retaining lever 121 is engaged in the recess 123a in the cam 123, so as to stop lockingly the sprocket 107 from rotating. In the meantime the counter wheel 97 is rotationally moved to show the greatest numeral "27" inside the indicator window 19. The area 126b corresponding to the edge number E is positioned on the exposure aperture 28a.

Note that, as illustrated in FIG. 20, a positioning hole 111 and hook receivers 110a and 110b are provided for attachment of the photo-taking section 103 to the main body 100 in a removable fashion. A shutter cover 115 not only prevents the shutter blade 114 from detaching but also holds the taking lens 15. Note that a shutter base 110 is provided with shafts 110c and 110d and a bearing sleeve 110e. On the shaft 110c are rotatably mounted the counter wheel 97 and the actuating lever via a screw. On the shaft 110d is rotatably mounted the retaining lever 121 via a screw. The retaining lever 121 is biased by the spring 120 clockwise.

When a shutter button 96 is depressed, a member like the arm 39 (see FIG. 5) swings the retaining lever 121 counterclockwise. The retaining lever 121 is disengaged from a portion of the actuating lever 119, which is rotated by the spring 120 counterclockwise from the cocked position. An actuating edge 119b of the arm 119a kicks away the claw 114a of the shutter blade 114, so as to rotate the shutter blade 114 instantaneously. This presses the claw 114a to the right as viewed from the front, swings the shutter blade 114 clockwise, opens a shutter aperture 112, and exposes the film area 126a. The shutter blade 114 is swung clockwise to disengage the actuating edge 119b from the claw 114a. A spring 116 returns the shutter blade 114 to the position of the parts at the time of closing the shutter aperture 112.

In a similar manner, a following frame on the film 21 is exposed in correspondence with the edge number "24", while the numeral "26" is shown inside the indicator window 19. Exposure is repeated until the 27th picture frame is used by exposing the area 126c corresponding to the edge number double zero (00), while the numeral "1" is shown inside the indicator window 19. Successive operation of the wind-up wheel 98 brings the raised end 121a into contact with the claw 97b so as to prevent the retaining lever 121 from rotating, and to free the driven sprocket 107. The winding-up wheel 98 is continuously rotated to wind up the film 21 into the cassette shell 105 sufficiently with the film leader 21b. Then the user manually operating the wheel 98 feels only a lowered load on the wheel 98. The ending sign "E" is shown inside the indicator window 19, to complete the operation of the film unit 90.

After all possible exposures have been made, the film unit 90 is forwarded to a photo laboratory, where the bottom lid 14a is opened, and the cassette shell 105 containing the film 21 is drawn out to take out the film 21 for photofinishing. The operator of the photo laboratory sees the numerical sign "+3" outside the cassette shell 105, recognizes addition of three in number of exposures, and regulates the amount of pulling the leader 21b and the position of cutting off the film 21 from the spool 109, in accordance with the previously realized information for handling the film unit adapted to additional exposure. As the picture frames are positioned in unchanged and unique fashion on the film 21, development of the film 21 can be performed without cutting down, fogging, or in some way damaging the starting and ending frames.

Figure 24:
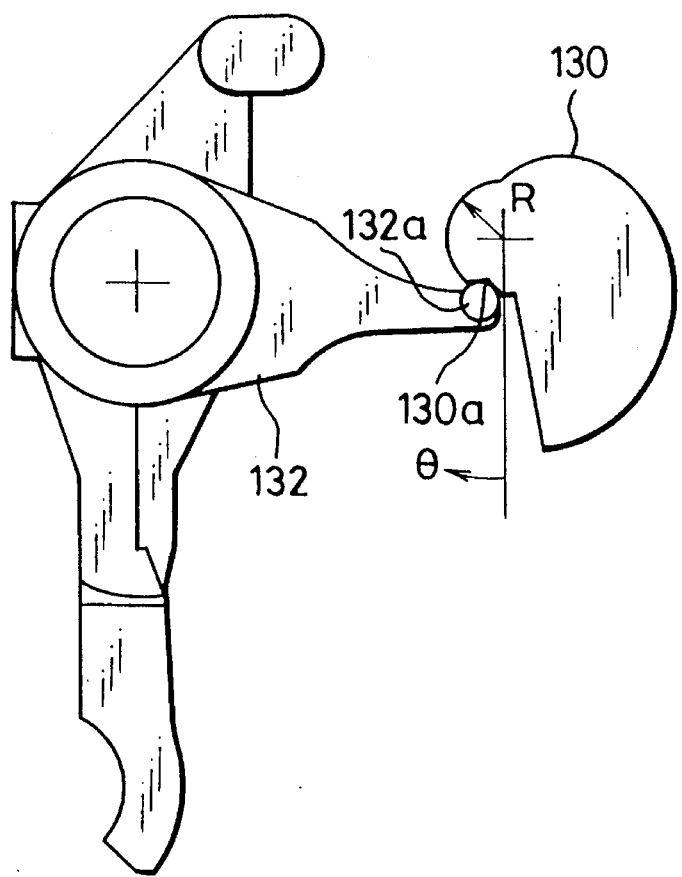
FIG. 24 is a plan view illustrating another preferred shutter cocking cam and driven claw.
Figure 25:
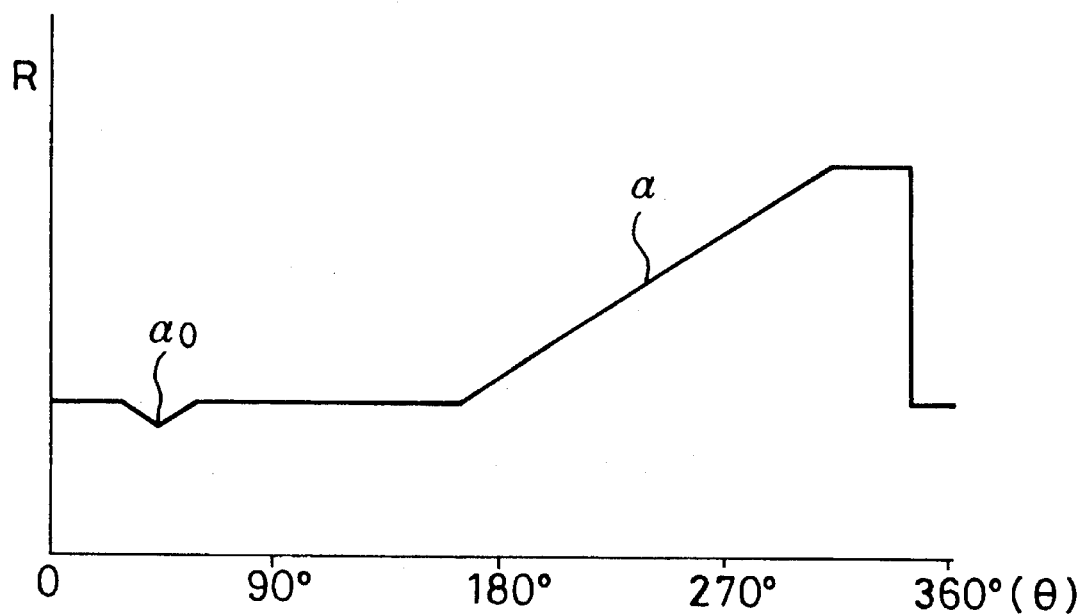
FIG. 25 is a graph illustrating a cam curve.
Figure 26:
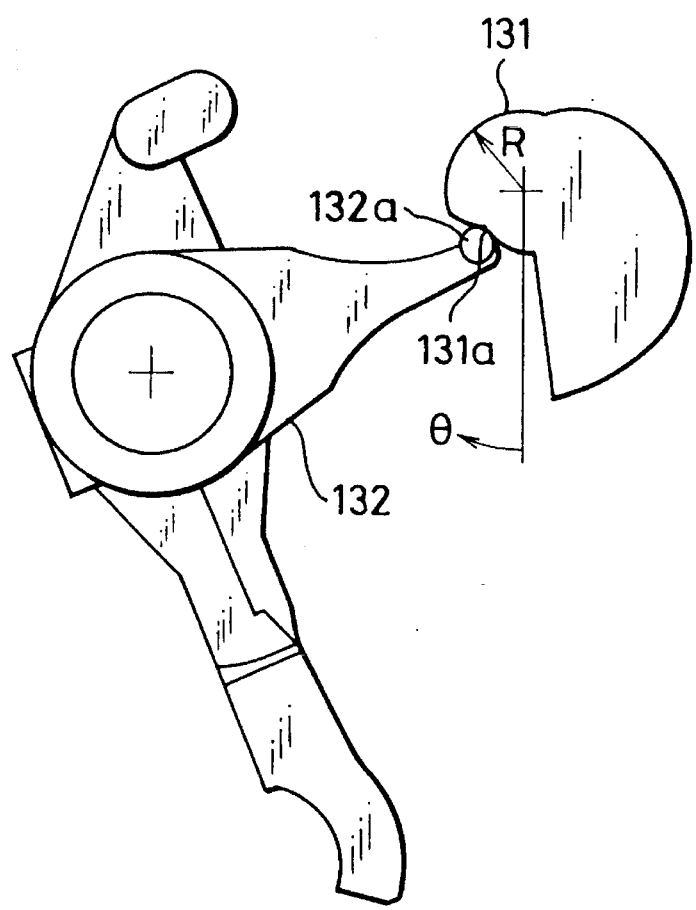
FIGS. 26 and 27 are views similar to FIGS. 24 and 25, respectively, but illustrating another preferred embodiment.
Figure 27:
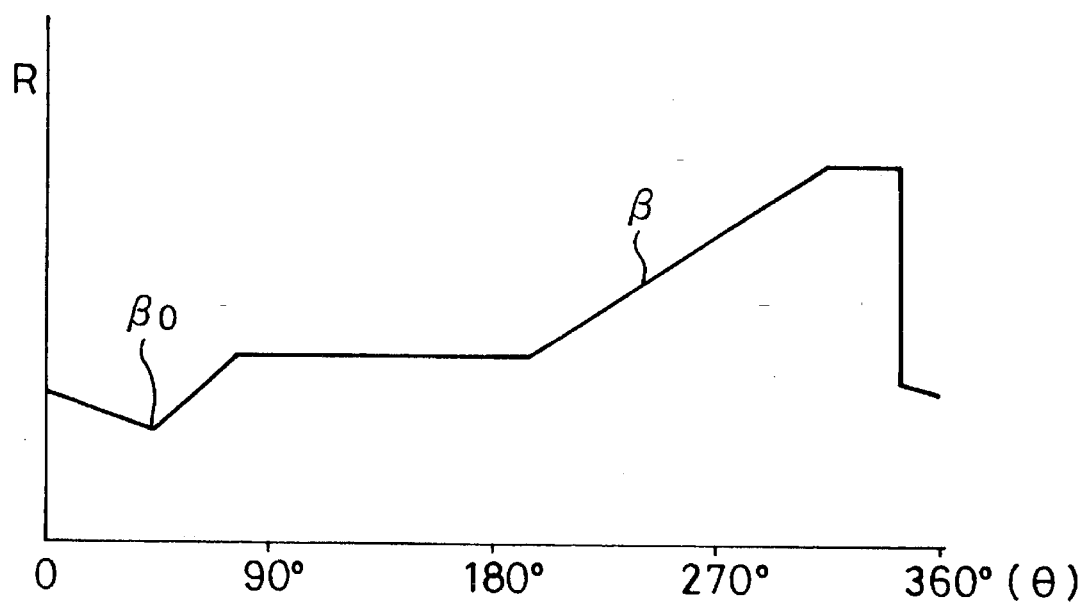

Referring to FIGS. 24 to 27, other preferred embodiments will now be described. Cams 130 and 131 for cocking the shutter mechanism, as illustrated in FIGS. 24 and 26, are provided with respective notches 130a and 131a, which have a V-shape adapted to retain an end 132a of a driven claw 132. The notch 131a is larger than the notch 130a. In FIGS. 25 and 27, lines α and β are curves which depict the shape of the shutter cocking cams 130 and 131, by plotting R against θ, wherein R is the radius of the cam and θ is the angle of rotation. Reference characters α0 and β0 correspond to the notches 130a and 131a. As will be understood from FIGS. 25 and 27, the bottoms of the notches 130a and 131a are closest to the rotational axis of the cams 130 and 131. The end 132a of the driven claw 132 is engaged with the notches 130a and 131a, so that the shutter cocking cams 130 and 131 are click-stopped. Note that the shape of the shutter cocking cam, of course, is not limited to those in these embodiments.

In the above embodiments, three frames are recorded in addition to the standard or stated number of photographable frames on the film 21. Alternatively, two or four additional frames may be exposed.

In the above embodiments, the counter wheel shows the remaining number of the photographable frames decrementally. Alternatively, a counter wheel may show the count incrementally, i.e. from 1 up to 27, or from 0 up to 26.

In the above embodiments, the film 21 drawn out of the cassette shell is wound into a simple roll with no spool. But alternatively, the roll of film 21 may be wound about an additional take-up spool. When such a take-up spool is used, the take-up spool with the roll of film 21 thereon may be contained in the film supply chamber 23 in rotatable fashion.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A method of manufacturing a lens-fitted photographic film unit, said lens-fitted film unit including a sprocket which is in mesh with perforations in photographic film and which is rotated by said film by a predetermined angle when said photographic film is advanced one frame, including a shutter mechanism which is cocked responsive to rotation of said sprocket, and including a winding-up wheel for winding up said film, said manufacturing method comprising:

inspecting operation of said shutter mechanism;

thereafter loading said photographic film into said lens-fitted film unit; and thereafter measuring the torque needed to rotate said winding-up wheel by rotating said winding-up wheel;

wherein said sprocket has eight teeth, and makes one rotation when said photographic film is advanced by one frame; and wherein said winding-up wheel is rotated to advance said film only M perforations during said measurement of torque, wherein $1 \leq M \leq 7$.

2. A film unit manufacturing method as defined in claim 1, wherein:

said film unit has a main body having an open rear, and attaching a rear cover to said rear of said main body to cover said rear in light-tight fashion;

said main body has a film supply chamber containing unexposed photographic film, a cassette-containing chamber containing a cassette for taking up said photographic film after exposure, and an exposure chamber located between said film supply chamber and said cassette-containing chamber;

said main body carries said sprocket, said shutter mechanism and a winding-up wheel, said winding-up wheel rotating when operated externally and having a fork; and inserting said fork into a cassette in said cassette-containing chamber and into connection with a spool of said cassette.

3. A method of manufacturing a lens-fitted photographic film unit, as claimed in claim 1, wherein M is 2.

4. A lens-fitted photographic film unit having a main body incorporating a photo-taking mechanism, a rear of said main body being preloaded with unexposed photographic film, a rear cover covering the rear of said main body, said lens-fitted photographic film unit comprising:

a film passageway disposed between said main body and said rear cover for permitting passage of said film;

an engaging member retractably projecting into said film passageway widthwise of said film; and a notch in an edge of said film, said notch opening widthwise outwardly of said edge of said film for engagement with said engaging member in order to retain said film in said film passageway, said notch being so located as to position said film in a predetermined position in a lengthwise direction within said film passageway.

5. A lens-fitted photographic film unit as defined in claim 4, wherein:

said main body has a film supply chamber containing unexposed photographic film, a cassette-containing chamber containing a cassette for taking up said photographic film after exposure, and an exposure chamber located between said film supply chamber and said cassette-containing chamber; and said main body carries said photo-taking mechanism and a winding-up wheel, said winding-up wheel rotating when operated externally and having a fork which is disposed in said cassette-containing chamber and is connected to a spool of said cassette.

6. A lens-fitted photographic film unit as defined in claim 4, wherein said engaging member projects into said notch with a spring characteristic, and retreats elastically from said film passageway when pressed by said film edge having said notch while said film is fed.

7. A lens-fitted photographic film unit as defined in claim 4, wherein said engaging member is integral with said main body.

8. A lens-fitted photographic film unit having a main body incorporating a photo-taking mechanism, a rear of said main body being preloaded with unexposed photographic film and covered by a rear cover, said lens-fitted photographic film unit comprising:

a film passageway disposed between said main body and said rear cover for permitting passage of said film;

a sprocket extending into said film passageway and having teeth engaged with perforations in said photographic film and recesses formed between adjacent teeth, said sprocket rotating by a predetermined angle when said photographic film is advanced by one frame; and a deeper recess formed in said sprocket between two of said teeth; and to fix an original position of rotation of said sprocket.

9. A lens-fitted photographic film unit as defined in claim 8, wherein said sprocket has eight teeth, and makes one rotation when said photographic film is advanced by one frame; and said sprocket when loading said main body with said film is set in said original position by said recess, said original position of said sprocket being N teeth short of an end position of one winding-up of said film, wherein 1≦N≦7, and said shutter mechanism in said original position is incompletely cocked.

10. A method of manufacturing a lens-fitted photographic film unit, said lens-fitted film unit including a sprocket of which eight teeth mesh with perforations in photographic film and which is rotated by a predetermined angle when said photographic film is advanced by one frame, and including a shutter mechanism that is cocked responsive to rotation of said sprocket, said manufacturing method comprising:

a first step of setting said sprocket in a predetermined first rotated position which is N teeth short of a sprocket position at the end of one winding-up of said film, wherein 1≦N≦7, and whereby, in said first rotated position, said shutter mechanism is partially cocked; and thereafter loading said photographic film while maintaining said sprocket in said predetermined first rotated position.

11. A method of manufacturing a lens-fitted photographic film unit, said lens-fitted film unit including a sprocket of which eight teeth mesh with perforations in photographic film and which is rotated by a predetermined angle when said photographic film is advanced by one frame, including a shutter mechanism which is cocked responsive to rotation of said sprocket, and including a winding-up wheel for winding up said film, said manufacturing method comprising:

inspecting operation of said shutter mechanism;

thereafter setting said sprocket in a predetermined first rotated position which is N teeth short of an end position of one winding-up of said film, wherein 1≦N≦7, and whereby, in said first rotated position, said shutter mechanism is partially cocked;

thereafter loading said photographic film while maintaining said sprocket in said predetermined first rotated position; and thereafter measuring the torque needed to rotate said winding-up wheel by rotating said winding-up wheel.

12. A method of manufacturing a lens-fitted photographic film unit, said lens-fitted film unit including a main body containing a cassette having a spool; photographic film having a film trailer attached to said spool, said film being wound as a roll beside an exposure aperture and having a length sufficient for the exposure of P picture frames; a sprocket having teeth in mesh with perforations in said film and rotating by a predetermined angle when said photographic film is advanced by one frame; and a shutter mechanism which is cocked responsive to rotation of said sprocket; said manufacturing method comprising the steps of:

mounting on said film unit a counter driven by said sprocket, said counter having indications of the number of photographable frames, said number of indications including an indication of a maximum predetermined number in excess of P;

drawing said film, in a darkroom, out of said cassette, while winding said film into a said roll;

stopping said sprocket in a released state of said shutter mechanism; and loading said main body with said cassette and said roll while said sprocket remains stopped.

13. A film unit manufacturing method as defined in claim 12, further comprising the steps of:

winding said film on a jig to load said main body with said film; and withdrawing said jig from said film.

14. A lens-fitted photographic film unit having a main body of which a rear portion is preloaded with unexposed photographic film, of which said rear portion is covered by a rear cover in light-tight fashion, said lens-fitted photographic film unit comprising:

means defining a film passageway between said main body and said rear cover for permitting passage of said film;

a sprocket extending into said film passageway, said sprocket having teeth engaged with perforations in said photographic film and making one rotation when said photographic film is advanced by one frame;

a shutter mechanism incorporated in said main body for exposing said film and adapted to be cocked responsive to rotation of said sprocket and to be actuated by a release button; said shutter mechanism including:

a shutter blade;

a cam member mounted coaxially with said sprocket;

a shutter actuating lever driving said shutter blade, said lever being in contact with said cam member and being adapted to be displaced by said cam member and moved into a cocked state by one rotation of said sprocket; and an engaging notch formed in said cam member and receiving an end of said shutter actuating lever immediately when said shutter blade is driven, so as to stop said cam member and said sprocket from rotating, said engaging notch and said end of said shutter actuating lever being of complementary shapes to allow clicking engagement of said end in said notch, said notch having opposite side walls engaging opposite sides of said end of said shutter actuating lever to prevent rotation of the sprocket in either direction.

15. A lens-fitted photographic film unit as defined in claim 14, wherein said engaging notch has a U-shape.

16. A lens-fitted photographic film unit as defined in claim 14, wherein said engaging notch has a V-shape.

17. A lens-fitted photographic film unit including a main body incorporating a photo-taking mechanism, unexposed photographic film preloaded in a rear portion of said main body, said film having a film leader and a film trailer and having a length adapted for the exposure of P picture frames, said lens-fitted photographic film unit comprising:

an exposure aperture formed in said main body for creating picture frames;

a cassette contained in said main body beside said exposure aperture and provided with a spool to which said film trailer is attached, said film being wound as a roll on the side of said exposure aperture opposite said cassette;

there being only first to Pth edge numbers recorded on an edge of said film, and arranged from said film leader toward said film trailer at the same pitch as said picture frames;

a first area arranged on a side of said film leader beyond a picture frame corresponding to said first edge number, and adapted to provide a picture frame in addition to picture frames corresponding to said edge numbers;

a second area arranged on a side of said film trailer beyond a picture frame corresponding to said Pth edge number, and adapted to provide a picture frame in addition to said picture frames corresponding to said edge numbers; and a counter wheel having means for disabling a shutter cocking mechanism during winding up of the fully exposed film into the cassette, said disabling means having a reduced arcuate extent corresponding to said second area.

18. A lens-fitted photographic film unit as defined in claim 17, wherein said film is wound into said cassette after each exposure.

19. A lens-fitted photographic film unit as defined in claim 18, wherein two additional picture frames are provided in said first area, and one additional picture frame is provided in said second area.

20. A lens-fitted photographic film unit having a film housing incorporating a photo-taking mechanism and pre-containing photographic film and a cassette, wherein a spool in said cassette is rotated after each exposure, to wind said film into said cassette in which a film trailer of said film is secured to said spool, a driven sprocket wheel is engaged with perforations in said film, a winding-up stop mechanism for stopping said film from being wound is enabled in response to one rotation of said sprocket wheel, means disabling said winding-up stop mechanism after effecting exposures in a predetermined number, to wind said film inclusive of a film leader into said cassette, and said film is of a 135-type having a length standardized by ISO, said lens-fitted photographic film unit comprising:

edge numbers, recorded on said film from said film leader toward said film trailer in accordance with said standardized length of said film;

means actuating said winding-up stop mechanism after exposure in a first frame area associated with the first one of said edge numbers;

at least one extra frame area on said film, on said film leader to be exposed past said first frame area; and means disabling said winding-up stop mechanism responsive to exposure of said at least one extra frame area and thereafter to wind said film leader fully into said cassette.

\* \* \* \* \*